US012705882B2

(12) United States Patent
Roy

(10) Patent No.: US 12,705,882 B2
(45) Date of Patent: Aug. 11, 2026

(54) DRONE-BASED, AIRBORNE SENSORY SYSTEM FOR FLOOD ELEVATION AND FLOOD OCCURRENCE PROBABILITY MEASUREMENTS AND RETURN PERIODS BY PROXY MEASUREMENTS AND METHOD THEREOF

(71) Applicant: Swiss Reinsurance Company Ltd., Zürich (CH)

(72) Inventor: Anup Kumar Roy, Sugar Land, TX (US)

(73) Assignee: Swiss Reinsurance Company Ltd., Zürich (CH)

(*) Notice: Subject to any disclaimer, the term of this patent is extended or adjusted under 35 U.S.C. 154(b) by 191 days.

(21) Appl. No.: 18/655,995

(22) Filed: May 6, 2024

(65) Prior Publication Data

US 2024/0290088 A1 Aug. 29, 2024

Related U.S. Application Data

(63) Continuation of application No. PCT/EP2023/077532, filed on Oct. 5, 2023.

(30) Foreign Application Priority Data

Oct. 5, 2022 (CH) .......................... CH001180/2022

(51) Int. Cl.
*G06K 9/00* (2022.01)
*B64U 10/13* (2023.01)
(Continued)

(52) U.S. Cl.
CPC ............. *G06V 20/17* (2022.01); *B64U 10/13* (2023.01); *B64U 2101/30* (2023.01); *B64U 2101/40* (2023.01)

(58) Field of Classification Search
CPC .... G06V 20/17; B64U 10/13; B64U 2101/30; B64U 2101/40; G01C 21/38; G01C 25/00; G06Q 40/08; G06Q 50/02; G06Q 50/165
See application file for complete search history.

(56) References Cited

U.S. PATENT DOCUMENTS

2023/0245444 A1* 8/2023 Brockers ................ G06T 17/05 348/144
2023/0350065 A1* 11/2023 Yun ......................... G01S 17/89

FOREIGN PATENT DOCUMENTS

CN 107356230 B 10/2020
CN 108344397 B 10/2020
JP 2021-125163 A 8/2021

OTHER PUBLICATIONS

Cosenza, Diogo N., et al. “Impact of calibrating filtering algorithms on the quality of LiDAR-derived DTM and on forest attribute estimation through area-based approach.” Remote Sensing 12.6 (2020): 918. (Year: 2020).*

(Continued)

*Primary Examiner* — Gregory A Morse
*Assistant Examiner* — Owais I Memon
(74) *Attorney, Agent, or Firm* — Oblon, McClelland, Maier & Neustadt, L.L.P.

(57) ABSTRACT

A drone-survey measurement-based inundation probability forecast and flood hazard vulnerability measuring system and method. Location-specific elevation data are measured by drones of the measuring system, the measured location-specific elevation data being transmitted to an inundation engine for forecasting flood hazard vulnerability zones and risk zones based on the measured location-specific elevation data depending on return periods or inundation heights of a flood hazard.

18 Claims, 18 Drawing Sheets

(51) Int. Cl.
*G06V 20/17* (2022.01)
*B64U 101/30* (2023.01)
*B64U 101/40* (2023.01)

(56) References Cited

OTHER PUBLICATIONS

Gebrehiwot, Asmamaw A., and Leila Hashemi-Beni. "Three-dimensional inundation mapping using UAV image segmentation and digital surface model." ISPRS International Journal of Geo-Information 10.3 (2021): 144. (Year: 2021).*
Ahmad, Anuar, et al. "Digital aerial imagery of unmanned aerial vehicle for various applications." 2013 IEEE international conference on control system, computing and engineering. IEEE, 2013. (Year: 2013).*
Rizk, Hamada, et al. "Drone-based water level detection in flood disasters." International journal of environmental research and public health 19.1 (2021): 237. (Year: 2021).*
Mehmet, Buyukdemircioglu et al., "Reconstruction and Efficient Visualization of Heterogeneous 3D City Models", Remote Sensing, vol. 12, No. 13, Jul. 2, 2020.
Dale, Jonathan et al. "The use of small-Unmanned Aerial Systems for high resolution analysis for intertidal wetland restoration schemes", Ecological Engineering, Elsevier, Amsterdam, NL, vol. 143, Dec. 6, 2019.
Alkema, D et al. "The Influence of Floodplain Compartmentalization on Flood Risk within the Rhine-Meuse Delta", Natural Hazards, Kluwer Academic Publishers, DO, vol. 36, No. 1-2, Sep. 1, 2005.
International Search Report issued Nov. 30, 2023 in PCT/EP2023/077532.

* cited by examiner

H | height in meters

ImW | image width in pixels

GSD | ground sampling distance in centimeters/pixels

F | focal length in millimeters

SW | sensor width in millimeters

DRONE-BASED, AIRBORNE SENSORY SYSTEM FOR FLOOD ELEVATION AND FLOOD OCCURRENCE PROBABILITY MEASUREMENTS AND RETURN PERIODS BY PROXY MEASUREMENTS AND METHOD THEREOF

CROSS REFERENCE TO RELATED APPLICATIONS

This application is a continuation of and claims benefit under 35 U.S.C. § 120 to International Application No. PCT/EP2023/077532, filed Oct. 5, 2023, which is based upon and claims the benefit of priority under 35 U.S.C. § 119 from Swiss Application No. 001180/2022, filed Oct. 5, 2022, the entire contents of each of which are incorporated herein by reference.

FIELD OF THE INVENTION

The field of the invention is directed towards drone-based measuring systems for flood elevation and flood occurrence probability measurements and proxy measures of impact probability values. The measurements have to technically required precision to allow inter alia the automated operation and steering of flood event impact cover systems, as e.g. automated flood detection and flood risk systems providing risk cover, in particular parametric quasi-real-time cover, to one or more physical objects located in a selected geographic and/or topographic area. This invention further relates to automated methods and systems for automated location-dependent recognition and/or detection of flood occurrence probabilities and its impact on physical land-based objects, in particular projected or forecasted flood occurrence rates, flood elevations, strength and/or frequencies (often somewhat blurredly referred to as flood risks), where flood states are automatically measured or captured, and location-dependent forward-looking return period as proxy measures of probability values for a future time window are automatically forecasted, measured or generated based on the direct measuring link to the physical environment by the drone-based sensory devices.

BACKGROUND OF THE INVENTION

The present invention is an airborne, drone-based measuring system that uses drone sensory to measure detailed elevation data about locations and provide insights measurands about flood occurrence rates and risks. Using drone data for flood risk measurement in the risk-transfer technology is not common today. Drone flights are costly and time-intensive constraining the commercial attractiveness of such solutions, and the presentation of insights back to the client is either too static (a measure value sheet) or too labor-intensive (a 3D simulation that must be installed on the user's client system. It is to be mentioned, that term flood denotes and comprise herein all kind of flood causing natural catastrophic events as e.g. storms, hurricanes and/or tsunami events. The measurements related to drone-based, i.e. airborne, sensory measurands depending on the location-dependent event elevation, strength, location (as geographic area-based, cell-based, event strength line based, or geographic or topographic coordinate based (as latitude and longitude)), and measured temporal occurrence, in particular to measurable impacts associated with the occurrence of flood, storm, hurricanes or tsunami events.

Flood detection system and flood measurement systems have been one of the most active research areas in remote sensing today because saving human lives is one of the priorities once a disaster occurred. It is crucial in the coordination of fast response actions after a destructive disaster such as landslide and flood. Prior art systems have primarily concentrated on detecting changes occurred due to disaster, depending solely on in-situ sensors, and manually adjusted image processing techniques, such as band differencing and band rationing, post-classification comparison and object-based change detection method. To increase the accuracy of detection, some systems implement machine learning to improve the efficiency of extracting feature. Some prior art detection system use detection based on machine learning, e.g. hierarchical shape features in the bags-of-visual words setting to detect large-scale damage. Some of the cyclone track forecast systems use artificial neural networks, as e.g. multilayer feedforward neural networks, radial basis neural networks, and Random Forests in earthquake damage. Other damage detection systems use 2D and 3D feature of the scene or execute deep learning method in geological disaster recognition.

However, still, prior flooding detection systems are mostly focusing on in-situ sensor measurements or optical satellite measurements, and they are unsophisticated. Therefore, they encounter several significant problems. For instance, the range for inspecting the occurrence of the disaster is limited due to the inadequate number of sensor and also the accuracy of information transmission is low due to verbally transmitted information. This is particularly true for satellite imagery-based systems. For those systems, the systems involved are also often unable to handle a massive amount of satellite imageries and detect disaster occurrence in short period of time. Consequently, this may lead to misinterpretation of information or overlook of occurrence of a disaster. Based on this example, it shows the fact that it is difficult to access immediate performance improvement on flooding detection, monitoring and preventive management based on prior art systems. Therefore, one technical objective is to build an automatic measuring and detection system through monitoring and measuring the occurrence of a flooding using different and/or additional technical measuring means to capture measuring data in a broader range than via satellite and monitoring every single disaster, e.g. assisted by deep learning techniques as CNN or other machine-learning structures. The system should further be able to forecast location and occurrence details about future floodings, i.e. measure more precisely flood risk values.

Reliable flood, in particular flood elevation, detection and recognition systems are technically especially needed. Among the most impacting, damaging, and destructive natural or geophysical disaster of the world, floods are most frequent and uncertain type. Floods endangers lives, properties, infrastructures and damage a lot of livelihoods within a short period of time. Controlling floods are difficult, but minimizing the impact by technical approaches is necessary. It is difficult to identify which measure is the better strategy and policy to deal with the floods. The combination of the human vulnerability and the physical exposures result in flood hazards. These losses and hazards can be minimized by making aware the public beforehand by providing them the reliable and suitable measuring data about flood risks, i.e. about the measurable probability value of having a certain impact strength to an object by an occurring flood event with a certain strength. Reliable prediction by technical forecast systems relying on measuring parameter values, preparedness, prevention, diminishing, and damage assessment are the stages of flood disaster management. Flood inundation maps are an important technical tool for providing the data in an accessible way. They reflect for different flood event types, the topographic forecasted pattern of a particular site, the sum of people and physical objects at risk, population anticipation and coping with the disaster and flood protection works. These are a crucial technical requirement for automated flood risk mitigation and risk-transfer rate pricing, municipal planning, ecological studies and set up of emergency action plans. Advancements in Remote Sensing (RS), technical modelling and forecasting and Geographic Information Systems (GIS) turned out to be important and particularly technically useful in flood inundation mapping. Floods can be predicted and flood risk areas can be identified via modelling with appropriately selected sensory input like hydrologic engineering centers-river analysis system (HEC-RAS) and hydrologic engineering centers-hydrologic modelling system (HEC-HMS) clubbing with GIS and Remote Sensing (RS). For example, for one-dimensional and unsteady-flow simulations of the designed floods, HEC-RAS and GIS can be used. Flood maps be generated for different return periods and these maps can be mapped to provide a comparison with other maps, e.g. using gradient or deviation measurements. This can be required for the technical prediction of floods.

Not all flood events have the same impact, wherein the impact may vary in strength as well as in type and time duration and topographic parameters e.g. influencing the flow strength and direction etc. In urban contexts, for example, flooding can e.g. pose a significant hazard to moving vehicles and causes traffic disruption by placing water flow in the transportation network, resulting in vehicles being swept away, injuries, and the loss of life of passengers. The remote detection of urban flooding over a large area will allow cities to develop flood maps to reduce risk during weather events. Mapping urban flood events is a challenge for three main reasons: the urban environment is highly complex with waterways at submeter resolutions, the flooding will be shallow and ephemeral, and ponding means that the flooding extent will be discontinuous. Hydrologic models that are the conventional approach in flood forecasting struggle with these factors, making the application of these techniques difficult. Attempts have been made in the prior art to map urban flooding and flood risk with traditional prior art methods. However, high resolution hydrologic modelling structures may be effective at small scales (e.g., a few urban blocks) but the computational resources and highly accurate inputs required to properly model urban flooding at the community scale are not widely available with the current technology. These limiting factors exemplify the need to find technically based methods of mapping or predicting flooding that are less computationally intensive. The advantage of remote sensing is flood detection for large scale flood mapping without the need for highly accurate inputs and computationally intense processes to advance flood risk management.

While extreme flooding, especially that which falls in the 100-year event category, is quite understood, and mapped by a plurality of prior art systems, minor flooding is difficult to map and predict. This less severe flooding, known as nuisance flooding or NF, poses less of a hazard to industrial sites and property, but can still be inconvenient or even dangerous, especially to plants and the like. Though drier regions such as Southern California may not experience the same extreme, spatially extensive flooding common in other more humid parts, NF remains a problem during the rainy season, especially for aging infrastructure or current systems that are not designed to handle changing climactic patterns. NF is expected to become more of a problem in the future as the climate changes and sea levels rise. Coastal areas such as Southern California are particularly vulnerable to NF. There is a need to develop new reliable techniques to detect catastrophic flooding, also covering urban flooding, which may be also used for nuisance flooding, reducing the risks associated with flooding during heavy rainfall in various context, covering urban and rural environments.

In the technical field of remote sensing, systems have been developed in flood detection using optical methods such as aerial photographs or satellite imagery, such as SAR and LiDAR (Light Detection and Ranging) systems. SAR, or Synthetic Aperture Radar, is an especially promising technique. As an active sensor, the radar can detect the Earth's surface no matter what time of day it is or what cloud conditions prevail. Some prior art systems for the detection of flooding with SAR try to combine SAR imagery measurements from COSMO-SkyMed (Agency Spaziale Italiana, Rome, Italy) and Landsat 8 OLI data (Ball Aerospace and technologies, Boulder, CO, USA) to measure map flooding along rivers. Others rely on measured RASARSAT-2 SAR images and flood stage data based on the return period for the 2011 Richelieu River flood in Canada, and even others rely on using TerraSAR-X in tandem with very high-resolution aerial imagery to measure map floodings. Until now, SAR data was considered insufficient for mapping flooding in more complex topographies and zones as urban zones due to the low resolution and shadow and layover in the complex urban environment.

The technical need for reliable and fast measuring and/or forecasting systems is also reflected by the painfully lacking reliable automated flood impact and impact response or mitigation systems. For many countries, it is hardly possible to do a technically correct flood impact occurrence rating and/or determination based on predictive forward-looking impact measures. A glance at the loss history shows that physical damages and associated losses caused by flood events are equally high or higher than those of other natural catastrophic events as earthquakes, windstorms, or other perils. For many of those other perils various prediction and/or rating and/or early warning systems based on actual measuring parameter values already exist. Large physical part of industrial facilities, industrial power and time are lost by occurring flood events having a physical impact to such objects. Additionally, with the trend of increasing risk-transfer penetration for floods, the insurance and re-insurance industry is affected ever more by flood caused physical damages and losses. To extend the early warning and flood damage rating to detailed and even facultative business, however, the threat of immense data amounts has to be coped with. This is done by completely new simulation approaches simulating allowing to extrapolate actual physical measuring parameters to future, i.e. forward-looking time windows and geographic cells.

Further, in many countries, a large number of industrial facilities and homes have a significant and measurably predictable probability (risk) for being impacted by flood events, and reasonably should be covered by flood mitigation and risk-transfer processes. However, many prior art systems are not capable to reliable hedge against the peril of flood events, inter alia, due to the prevalence of moral hazard and adverse selection phenomena, for example, in entering risk-transfers for objects most affected by the specific peril of flood. In such cases, traditional risk-transfer is not available. Whereas for other damage risks, risk-transfer systems can be based on the use of the law of large numbers to precisely determine a relatively small premium amount to large numbers of objects in order to cover the occurring damages of the small numbers of impacted objects who have suffered a loss due to the event-based impact to their objects. In flood event covers, typically the number of impacted objects is larger than the available number of individuals interested in protecting their property/objects from the peril using risk covers, which means that most prior art insurance systems do not provide risk-transfers to occurring flood events since the probability of operating the system in a sound profit range are regarded as being remote. Additionally, while there are risk-transfer systems that are enabled to provide primary flood risk covers for high value homes, the underwriting and provision of such mitigation processes does not account for many flood risks.

In summary, natural disasters such as floods cause severe damage in various parts of the world. The occurrence of most of such disaster events is difficult, if not impossible, to predict over the long term by prior art measuring systems. Conventional flood mitigation techniques determine, assess, and estimate pricing of flood risks using parametric risk-transfer structures so as to mitigate flood risks by gathering information related to base flood elevation data, flood depth by using mitigation devices and survey information. In addition, digital marketplace techniques list online policies that guarantee a pre-agreed payout based on pre-determined parameters in case of a flood hazard. The digital marketplace techniques determine a water-elevation function factoring in high water probability data, leading to saving both risk-transfer providers' and customers' time and cost spent on building, inspection, and damage estimation.

Additional mechanisms for assessing flood risks use measured flood levels through detection chambers that assess flood risks based on a determined level of flood waves produced by air based pressure devices. Further, the measured flood levels can e.g. be used to automate signaling and triggering of flood risk transfer payout. Other available risk transfer mechanisms capture event data of occurred flood and maps data to a digital map along with data related to risk transfer of portfolio. The portfolio is mapped by geographic area and value so that an exposure and risk to the portfolio induced by a flood event is determined. Yet another mechanism for assessing flood risks by simulating movement of water in case of floods is to determine potential for water damage to surface of a structure. This mechanism provides automated expert advices relating to whether to apply flood risk-transfer/insurance for risk-exposed structure based on simulation of water movement in relation to the structure.

In the prior art, the document JP 2021/125163 A discloses a river flood and damage prediction device which predicts a point where flood occurs in a river basin and its suffering range. The river flood and damage prediction device performs coordinate transformation of survey data of a river basin including altitude data of an embankment of a river to create 3D point group data by a 3D point group data generation to predict a water level for every position vertically crossing the river and time to reach the water level based on water level and rainfall data of the river. Further to predict a flood occurrence point and flood occurrence time based on the 3D point group data, the water level for every position vertically crossing the river and the time to reach the water level, and to predict a damage range of the flood spreading from the flood occurrence point and time to spread over the damage range by referring to a hazard map. Further, the prior art document CN 108344397 B discloses an automated modeling method based on oblique photography comprising the steps of: (i) determining of a shortest route of an aerial survey region based on preset route height and overlapping degree information; detecting equipment state of an unmanned plane and oblique photography equipment of the unmanned plane based on the route; (c) screening of missed areas based on the equipment state, and carrying out an aerial survey until effective aerial survey data covering the aerial survey region is obtained; and (d) generating aerial survey data using image correction, texture characteristic matching, per pixel grade dense matching, and aerial triangulation, and a three dimensional plotting modeling. The document CN 107356230 B discloses a digital mapping system based on a live-action 3D model. Digital mapping is carried out by unmanned aerial vehicle oblique photography 3D modeling and cooperation with a ground survey robot acquiring high resolution live-action 3D model data. A control point coordinate acquired by the ground survey robot is used to control the overall accuracy of the model, an acquired feature point coordinate is used to compensate for the defect of low coordinate precision because of the influence of a barrier object on unmanned aerial vehicle aerial photography modeling. The document Buyukdemircioglu M. et al. "Reconstruction and Efficient Visualization of Heterogeneous 3D City Models", REMOTE SENSING, vol. 12, no. 13, 2 Jul. 2020, p. 2128, discloses a system for reconstruction and visualization of heterogeneous 3D city models using a framework for the integrated representation of existing urban structures in CityGML LoD2 combined with a future city model in LoD3. Existing city parts and the terrain are reconstructed using high-resolution aerial images, and the future city was designed in a CAD (computer-aided design) environment. The models are integrated using different digital terrain models. The document Dale J. et al. "The use of small-Unmanned Aerial Systems for high resolution analysis for intertidal wetland restoration schemes", ECOLOGICAL ENGINEERING, Amsterdam, NL, vol. 143, 6 Dec. 2019, discloses the use of small-Unmanned Aerial Systems for analysis of intertidal wetland restoration schemes. The system uses the emerging photogrammetric method Structure-from-Motion (SfM) on images taken using a small-Unmanned Aerial System (sUAS). A suitable degree of confidence is determined between the modelled surface and independent check point (vertical root-mean-square-errors of 0.0245, 0.0704 and 0.1571 for 2016, 2017 and 2018 re-spectively). DSMs of Difference (DoD) analysis is performed to evaluate elevation change, with areas up to 85 cm of accretion. Finally, the document Alkema D. et al. "The Influence of Floodplain Compartmentalization on Flood Risk within the Rhine-Meuse Delta", NATURAL HAZARDS, vol. 36, no. 1-2, 1 Sep. 2005, pages 125-145, shows the influence of floodplain compartmentalization on flood risks. In the used example, the compartmentalization layout within the river polders in the Dutch Rhine-Meuse delta is a result of abandonment and partial removal of secondary dikes and the construction of modern infrastructure embankments. These structures guide the flow of water in case the polder would inundate. Through the application of a 2-D flood propagation model in the polder, the system assesses explores whether restoration or removal of old dike remnants would contribute to a reduction of the risk and damage during an inundation. A set of 28 flood scenarios is simulated and for each scenario an additional damage and risk assessment is carried out.

SUMMARY OF THE INVENTION

It is one object of the present invention to provide drone-based measuring system able to measure detailed elevation data about locations. It is further an object of the present invention to provide a measurement-based system for detailed and reliable flood risk measurements and forecasts. The drone-based sensory data should allow for flood risk measurements in the technically required precision and accuracy to allow operation of risk-transfer technology overcoming the deficiencies of the above discussed prior art systems, which inter alia rely on the fact that drone flights are costly and time-intensive constraining the technical attractiveness of such measurements and measuring techniques, and the generation of insights back to the user is either too static, e.g. sheet-based, or too labor-intensive, e.g. 3D simulations which must be installed on a client of the system). It is further an object of this invention to provide a new, reliable, and more precise flood forecasting, monitoring, and measuring based on drone measurements, which as an embodiment variant is used as input measuring parameters for flooding forecast, e.g. in the context of automatically providing dynamic adaptable flood impact cover, which does not have the above-mentioned disadvantages of the prior art. In particular, it is an object of the present invention to provide a precise steering and electronic operation of flood impact cover based on physical objects on an extend of a flooded area.

According to the invention, the above-mentioned objects related to a drone-survey measurement based inundation probability forecast and flood hazard vulnerability measuring system and method, in that location-specific elevation data are measured by drones of the measuring system, the measured location-specific elevation data being transmitted to an inundation engine for forecasting flood hazard vulnerability zones and risk zones based on the said measured location-specific elevation data depending on return periods or inundation heights of flood hazards, in that the measuring system and/or the inundation engine comprises a geo-tagging graphical user interface for selecting perimeter points of a definable polygon on a geographical and/or topographical map provided by the geo-tagging graphical user interface, the polygon segregating a defined geographical area of the geographical and/or topographical map falling with said polygon, in that the measuring system comprises one or more drones with at least one optical sensor or camera for optical image sensing, wherein different subareas of the geographical area defined by the polygon are captured by optical images, and wherein each possible location within the polygon is sensed at least by two of the optical images measured by the optical sensor or camera of the drone, in that inundation engine comprises a 3D data extractor linked via a data transmission interface to the one or more drones, wherein the captured optical images are transmitted from the at least one drone to the 3D data extractor, and wherein a drone measurement-based 3D digital twin of the geographical area defined by the polygon is extracted by three-dimensional measurements from the two-dimensional optical images, in that measuring system comprises a calibration module to capture at least two ground control points within the geographic area defined by the polygon, wherein a ground control point is a defined mark on a target surface of the geographic area linked with geographical and/or topographical coordinates, and wherein the ground control points provide georeferencing and geo-calibration for the drone-based image measurements within the polygon and the extracted 3D digital twin by assigning geographical coordinate data to the 3D digital twin, and in that the inundation engine comprises a flood hazard aggregator for generating a flood hazard vulnerability or risk for one or more objects/industrial assets and/or building structures and/or agriculture structures situated within the polygon depending on forecasted or user-specifically selected return periods and/or inundation heights based on flood hazard damage impacts to the one or more objects/industrial assets and/or building structures and/or agriculture structures associated for different inundation heights and/or return periods depending on the measured 3D digital twin.

This has, inter alia, the advantage that the inventive system allows for a web-based and/or quasi-realtime flood risk assessment and drone-sensory based precise measurement. The measuring system can be realized as a web-based, electronic GIS (Geographic Information System) digital platform allowing users to navigate areas of interest and assess flood risks with the respect to return periods and/or rainfall data and/or inundation heights. The system can e.g. generate and visualize floodings as geographic data, for example being realized within a spatial database. The inventive spatial flooding database is realized as a database (in particular realized as a relational database) that is, according to the inventive system, enhanced to include spatial data that represents flooding areas and objects defined in a geometric space, along with the below discussed the technical querying and analyzing means for such data. The inventive spatial database can, to capture floodings and appropriate elevations, e.g. comprise representations of simple geometric objects such as points, lines, and polygons. However, the inventive spatial database can e.g. handle also more complex structures such as 3D objects, topological coverages, linear networks, and triangulated irregular networks (TINs). One of the core functionality added by the inventive spatial extension to the proposed spatial database is one or more spatial datatypes, which allow for the storage of spatial flooding data as attribute values in a table. For example, a single spatial value can be realized by a geometric primitive (point, line, polygon, etc.) based on a vector data model. The datatypes in most spatial databases can e.g. be based on the OGC Simple Features specification for representing geometric primitives. The spatial database can e.g. also support the storage of raster data for covering a flooded area. Because all geographic locations must be specified according to a spatial reference system, the inventive spatial database also allow for the tracking and transformation of coordinate systems. Thus, when a spatial column is defined in a table, it can also include a choice of coordinate system, chosen from a list of available coordinate systems that can e.g. be stored in a lookup table. Another functionality extension in the inventive spatial database for floodings can e.g. be the addition of adjusted spatial capabilities to a chosen query language (e.g., SQL); providing the inventive spatial database the same query, analysis, and manipulation operations that are available in other GIS systems. For example, this functionality can e.g. be implemented as a set of new functions that can be used in SQL SELECT statements. Several types of operations can e.g. be specified, as (i) Measurement: Generates line length, polygon area, the distance between geometries, etc.; (ii) Geoprocessing: Modify existing features to create new ones, for example by creating a buffer around them, intersecting features, etc.; (iii) Predicates: Allows true/false queries about spatial relationships between geometries. Examples include "do two polygons overlap?" or "is there an industrial site or other object located within a mile of the area forecasted as flooded?"; (iv) Geometry Constructors: Generates new geometries by specifying the vertices (points or nodes) which define the shape; (v) Observer Functions: Queries that return specific information about a feature, such as the location of the center of a circle.

Further, a spatial index can e.g. be used by a spatial database to optimize the proposed spatial queries. In the prior art, database systems use indices to quickly look up values by sorting data values in a linear (e.g. alphabetical) order; however, this way of indexing data is not optimal for the herein proposed spatial queries in two- or three-dimensional space. Instead, the proposed spatial database can e.g. use a spatial index designed specifically for multi-dimensional ordering, which can e.g. include binary space partitioning (BSP-Tree) allowing to subdivide space by hyperplanes, bounding volume hierarchy (BVH), and/or R-tree for indexing the monitored spatial data, where objects (shapes, lines and points) are grouped using a minimum bounding rectangle (MBR) and where objects are added to an MBR within the index that will lead to the smallest increase in its size, etc. The proposed spatial query is realized as a special type of database query supported by the inventive geodatabases. The query differs from non-spatial SQL queries in that it allows for the use of geometry data types such as points, lines, and polygons and that the query allows to consider the spatial relationship between these geometries. The inventive GIS and location intelligence system allows to generate and provide location-enabled services, which rely on geographic analysis and visualization of one or more floodings. The inventive system allows to provide the technical capability to relate previously unrelated information, through the use of location, in particular flooding location, as the "key index variable". Locations and extents that are found in the Earth's spacetime are able to be recorded through the date and time of occurrence, along with x, y, and z-coordinates; representing, longitude (x), latitude (y), and elevation (z). All earth-based, spatial-temporal, location and extent references can e.g. be related to one another, and ultimately, to a "real" physical location or extent, in particular the extend of the flooding.

In addition, the measuring system can e.g. act as a location intelligence system or expert system providing precise measurements for loss prevention recommendations. Further, the measuring system is able to provide precise "what if scenario simulations and forecasts", e.g. by using artificial intelligence (AI)-based and/or machine-learning-based forward looking structures. The input parameters of the machine-learning-based forward looking structure can e.g. be varied to detect and identify areas where additional drone-based sensory measurements, e.g. regarding spatial resolution of the measuring data and/or precision of the elevation measurements etc., increase the measuring precision of the system. Such areas for additional drone-based sensory measurements can also be identified by user-specific selection, where in the measuring system refines and augments the measuring precision of the drone-based measurements upon request and selection. By the present measuring system, the user is enabled to draw a structure whit a given height and is enabled to specifically simulate dedicated measuring and/or forecasting results and/or specified parts of the measurements, e.g. in respect to location, extend of the area, precision of the elevation measurements etc. . . . In particular, the user is enabled to specifically simulate results to see how much inundation can be protected using definable and adaptable embarkments height.

BRIEF DESCRIPTION OF THE DRAWINGS

According to the present invention, these objects are achieved particularly through the features of the independent claims. Additional features and advantages will become apparent to those skilled in the art upon consideration of the following detailed description of illustrative embodiments exemplifying the best mode of carrying out the method as presently perceived.

The present disclosure will be described hereafter with reference to the attached drawings, which are given as non-limiting examples only, in which.

Figure 5:
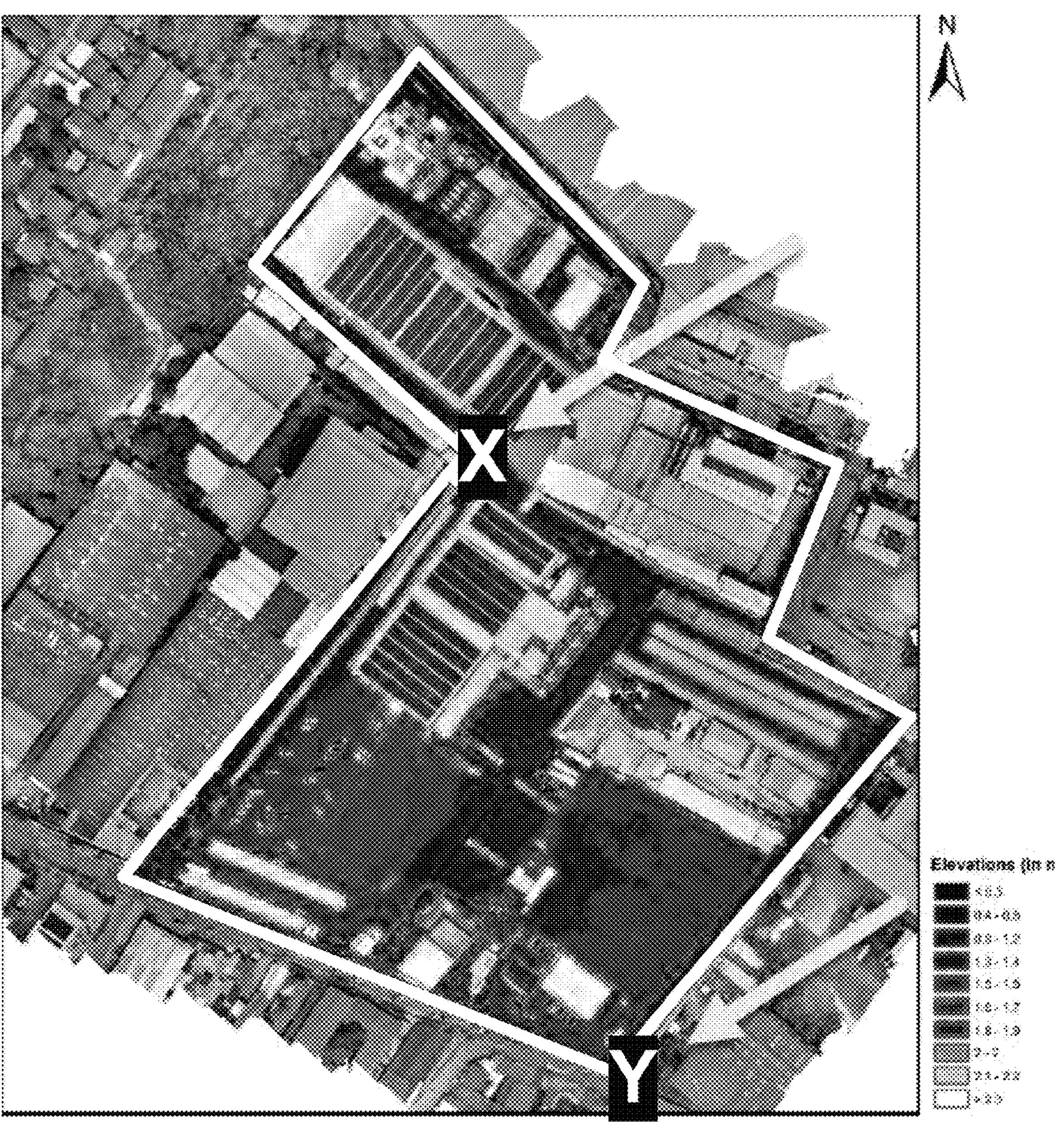

FIG. 5 shows a diagram, schematically illustrating a concrete example of a digital terrain model extracted from the optical images 122 by the data extractor 112. As reference point, the ground control point 1131 marked as X is used: Datum_WGS1984, which is the lowest point at the target side or facility 11122: 0.9 m. In the example, the external road (marked as Y) is at ~40 cm above the lowest point.

Figure 6:
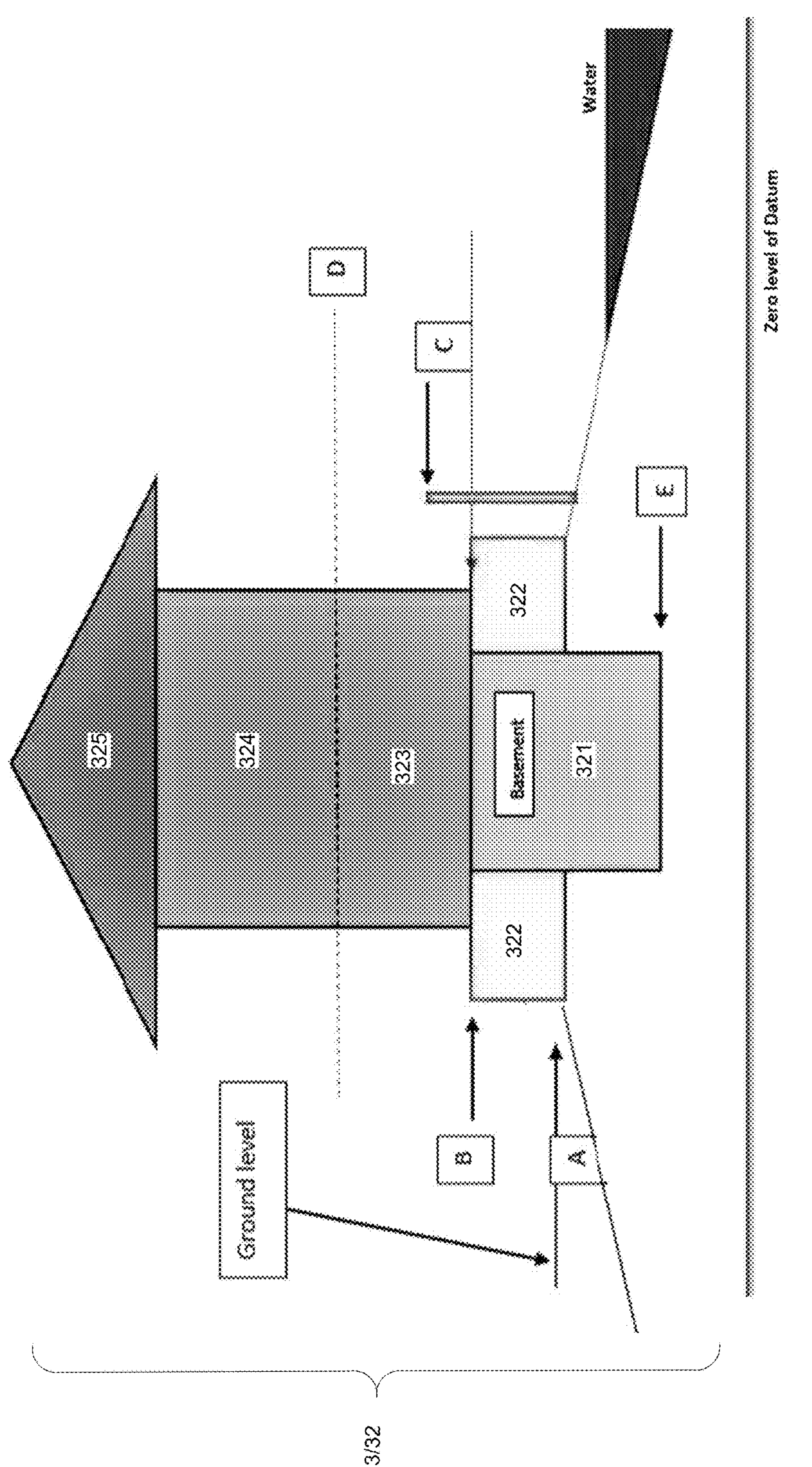

FIG. 6 shows a diagram, schematically illustrating a concrete example of the inventive approach of illustrated by an elevation diagram extracted from the 3D digital twin 1121. Building details can e.g. be also inputted to allow a more precise 3D digital twin construction. In an example, there can e.g. be a main production building with a certain year of construction, a number of stories, a gross area ($m^2$), a roof height (m), a finished flood elevation relative to facility's internal road (ground terrain) (m), and a height of equipment/stock above FFE. The data are typically captured with respect to zero level of a geo-reference system as the World Geodetic System (WGS; e.g. WGS1984 datum). FFE is a term related to elevated building: A building that has no basement and a lowest floor that is elevated to or above the Base Flood Elevation (BFE) by foundation walls, shear walls, posts, piers, pilings, or columns. First Floor Elevation (FFE): The elevation of the top of the lowest finished floor in a building. A parameter characterization, as the FFE can be used to construct and reference the digital 3D twin parameters. The BFE measure is given a flood having a one percent chance of being equaled or exceeded in any given year. With other words. This is the elevation of surface water resulting from a flood that has a 1% chance of equaling or exceeding that level in any given year. The BFE value can e.g. be measured on the flood risk rate map for different zones, e.g. AE, AH, A1-A30, AR, AR/A, AR/AE, AR/A1-A30, AR/AH, AR/AO, V1-V30 and VE. In the scope of the extension by the present invention, it also allows to give a measure for the risk a particular structure/building, in particular different height levels of the structure/building has of flooding if the water level rises. Thus, the BFE can be measured and/or forecasted herein as the expected water level rise during a flood with a 1% chance of occurring in any given year and given level height of a building/structure and/or sub-unit of a plant any industrial side.

Figure 7:
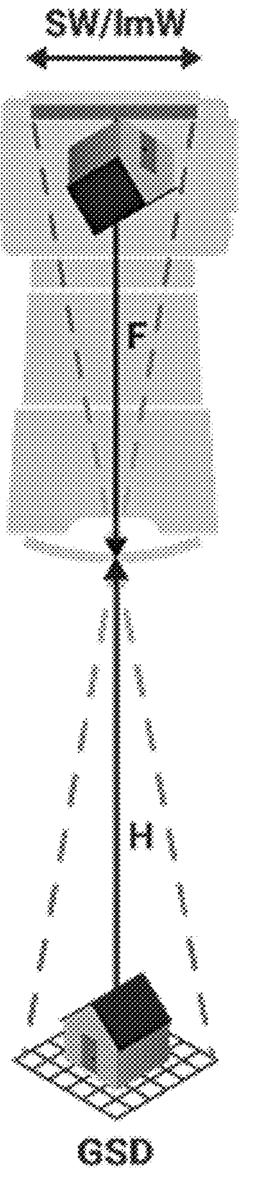

FIG. 7 shows a diagram, schematically illustrating the measuring of the Ground Sampling Distance (GSD) as the distance between two consecutive pixel centers measured on the ground. The bigger the value of the image GSD, the lower the spatial resolution of the image and the less optical details. As illustrated in FIG. 7 the flight height (H) and camera specifications (ImW, SW, and F) influence the GSD measure value. Since the present inventive system is highly resolution sensitive, in particular sensitive to the elevation resolution and accuracy of the measured parameters of the 3D digital twin 1121, one of the advantages is that the required GSD value can be set before starting the image acquisition and optical sensing with the drones 12 in order to adjust the flight height and the camera specifications to the inventive system's 1 requirements. For example, the more detailed reconstruction of the area 11122 is needed, the drones are steered to fly closer (low GSD) to the target surface of the geographic area 11122 within the polygon 1112 and the different sub-units 311, . . . , **31*i*/321, . . . , 32*i*/331, . . . , 33*i* of the objects/industrial assets 31 and/or building structures 32 and/or agriculture structures 33 within the polygon 1112. On the other hand, when the technically needed resolution and accuracy (e.g. 5 cm elevation accuracy), flying not unnecessary deeper (i.e. having a higher GSD parameter value) can reduce and optimize the acquisition time and batteries needed as well as reduce the processing time. Thus, the inventive systems 1** also has the advantage that it can be technically optimized in that sense.

Figure 8A:
Figure 8B:
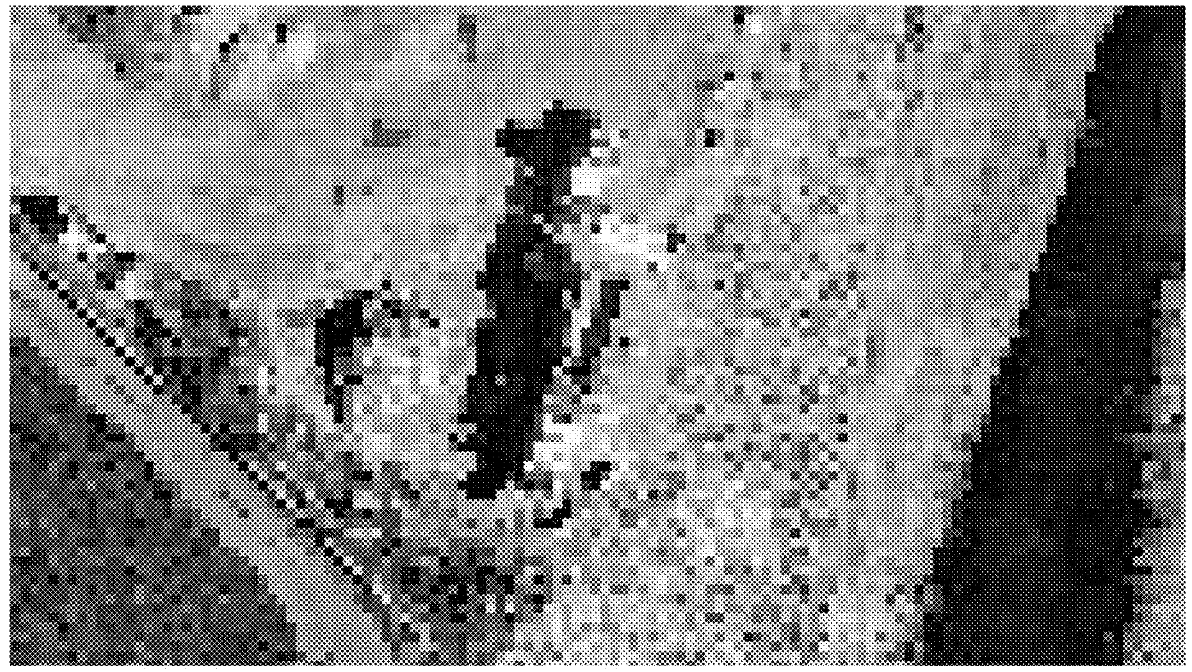

FIG. **8*a* shows a diagram, schematically illustrating an orthomosaic 1123 with a GSD of 5 cm, thus giving a more detailed resolution, while FIG. 8*b* shows a diagram, schematically illustrating an orthomosaic 1123 with a GSD of 30 cm resulting a less detailed resolution. The term orthomosaic 1123, as used herein, denotes a photogrammetrically orthorectified optical image assembly mosaicked from an image collection, where the geometric distortion has been corrected and the imagery has been color or grey-shade balanced to generate a seamless mosaic dataset. In general, an orthomosaic 1123 is a map that is made up of smaller orthophotos. Each aerial photo that a drone 12 captures is pinned to a geographic position. Optical images, i.e. photos, need to have an overlap of at least 70 percent to achieve an accuracy close to what is required for the present inventive system 1. Thus, an orthophoto 11231 is a single image with the distortions removed, while the orthomosaic or orthomap 1123 is the final optical map after stitching together all the individual orthophotos 111231**.

Figure 9:
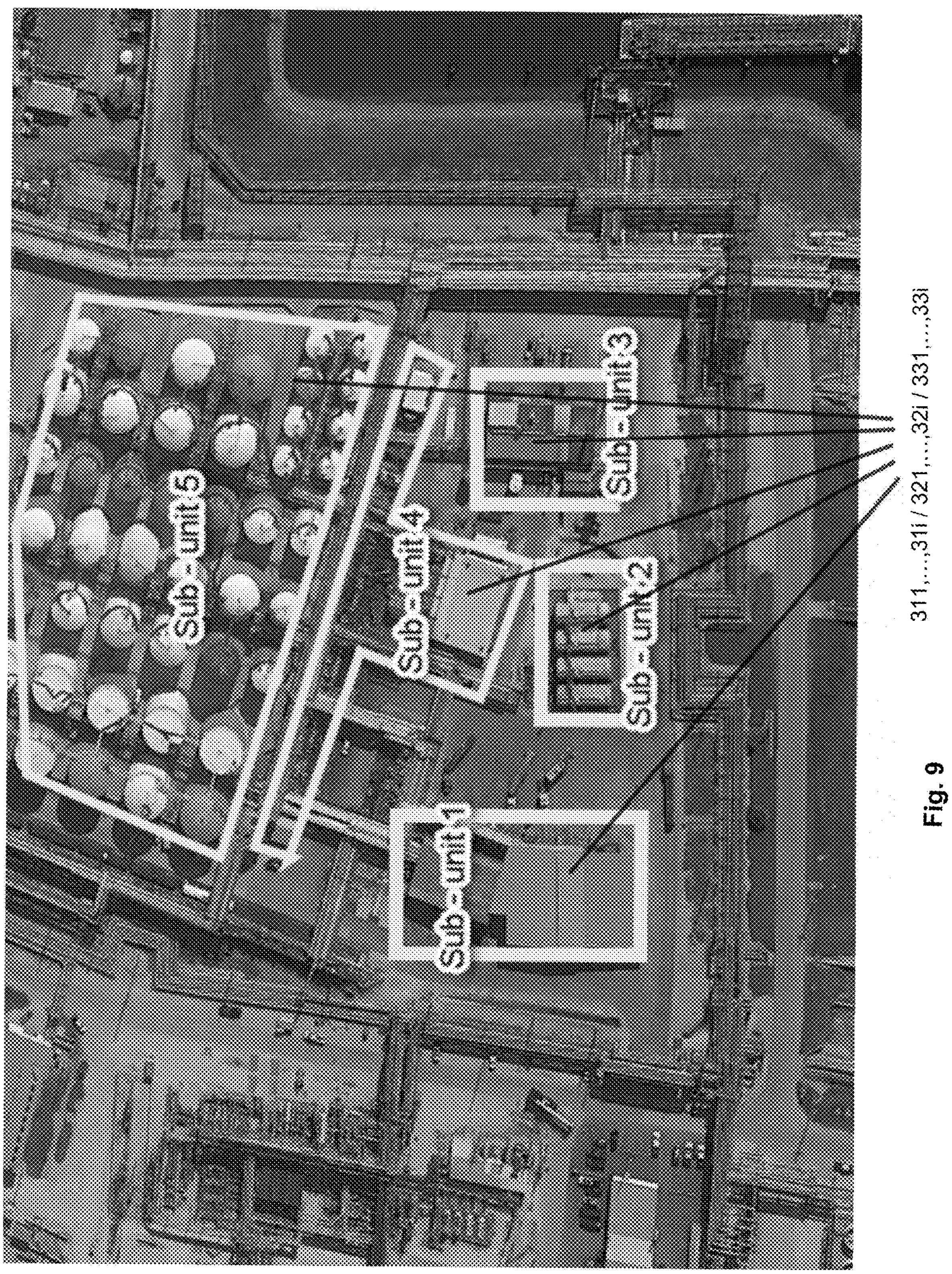

FIG. 9 shows a diagram, schematically illustrating that the geo-tagging graphical user interface 111 can e.g. comprise an interactive orthomap or orthophoto 1123 or just an interactive photo generated by the geo-tagging graphical user interface 111 for segregating different sub-units 311, . . . , **31*i*/321, . . . , 32*i*/331, . . . , 33*i* of the objects/industrial assets 31 and/or building structures 32 and/or agriculture structures 33 as functional components within the geographical area 11122 of the polygon 1112, wherein, by the geo-tagging graphical user interface 111, one or more functions and/or interactions and/or dependencies is assignable to each of the functional components 31, . . . , 33 in regard to one or more of other segregated components 31, . . . , 33. Each sub-units 311, . . . , 31*i*/321, . . . , 32*i*/331, . . . , 33*i* has its own damage vulnerability curve assigned and measured by the measuring system 1. The system 1 has the advantage that just by changing the water level (e.g. by a user through a slider) the system 1** is able to provide in real time a physical damage measure (e.g. indicated by a monetary damage (loss measures for various return periods for both PD (property damage) and BI (business interruption losses).

Figure 10:
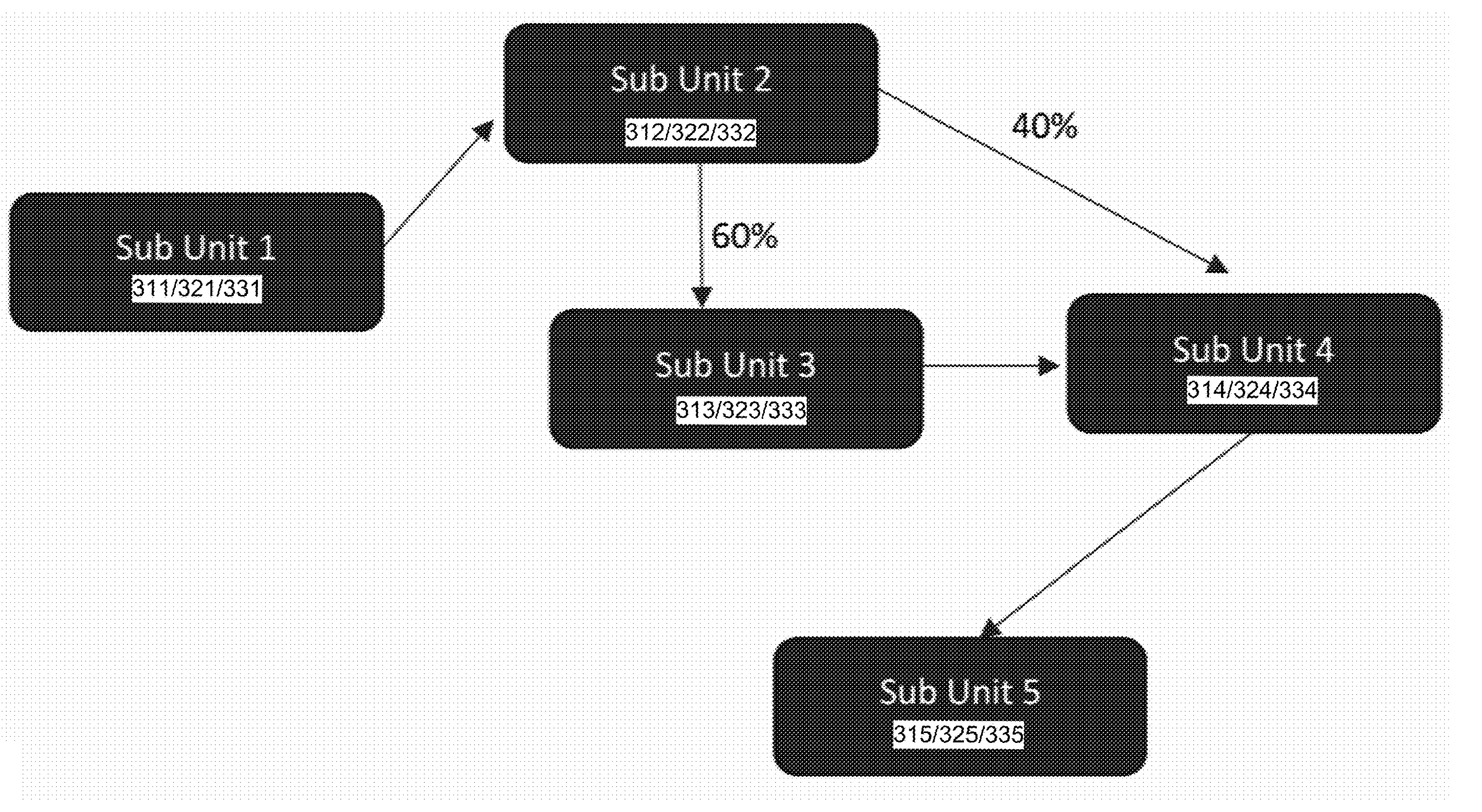

FIG. 10 shows a diagram, schematically illustrating a sub-units 311, . . . , **31*i*/321, . . . , 32*i*/331, . . . , 33*i* interaction scheme (which can also include parts of a business interruption model/scheme e.g. created through feedback with site personnel). The sub-units 311, . . . , 31***i*/321, . . . , 32*i*/331, . . . , 33*i* interaction scheme allows capturing dominos effect and redundancies between the units. For example, a break-down of a power supply unit or sub-unit, can induce the operational breakdown of a whole plant, while on the other side a damage of a storage unit may have only little immediate effect on the overall operation of an industrial plant.

Figure 11:
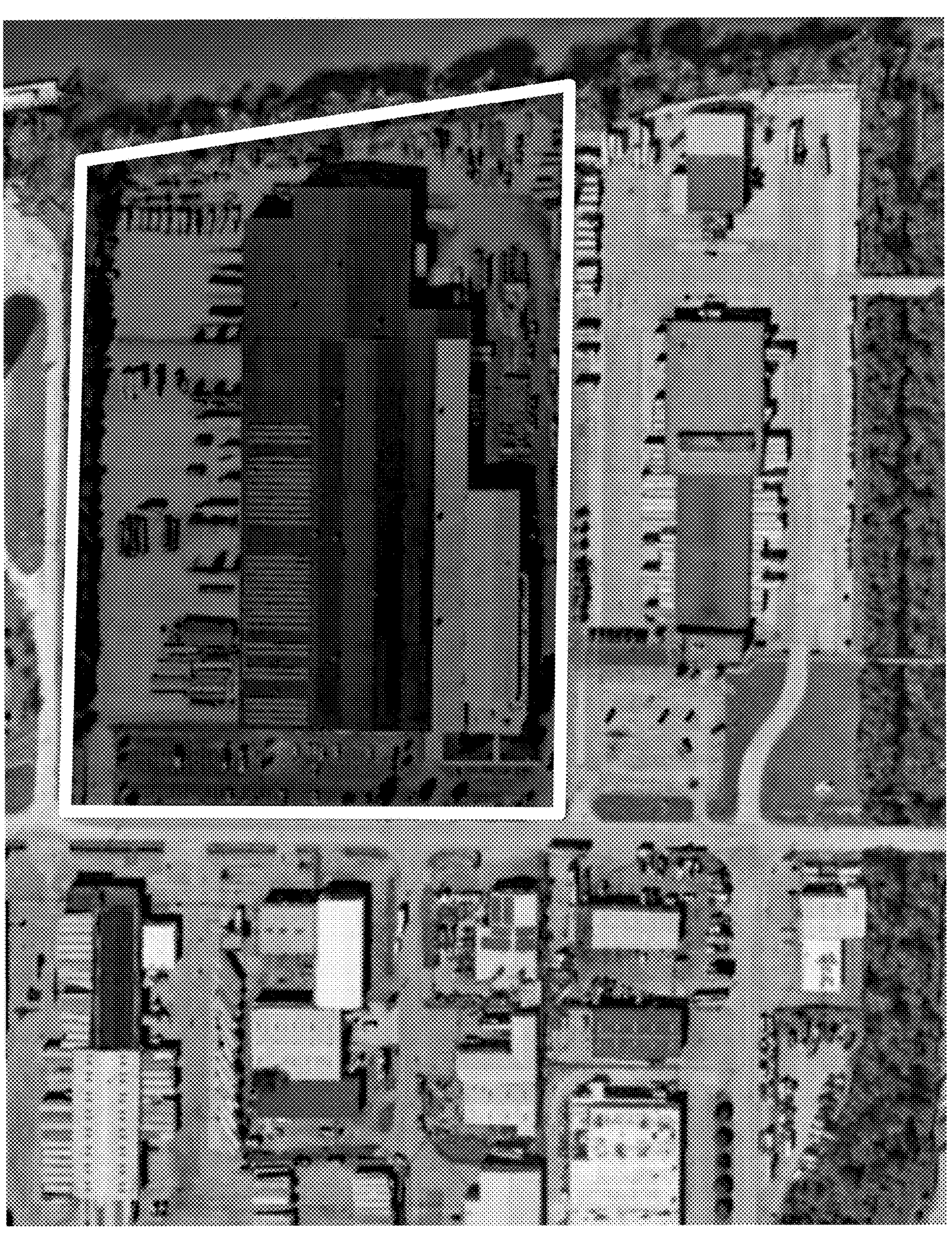

FIG. 11 shows a diagram, schematically illustrating the measuring system 1 and/or the inundation engine 11 comprising a geo-tagging graphical user interface 111 for selecting perimeter points 11121 of a polygon 1112 definable by a user 4 on a geographical and/or topographical map 1111 provided by the geo-tagging graphical user interface 111, the polygon 1112 segregating a defined geographical area 11122 of the geographical and/or topographical map 1111 falling with said polygon 1112.

Figure 12:
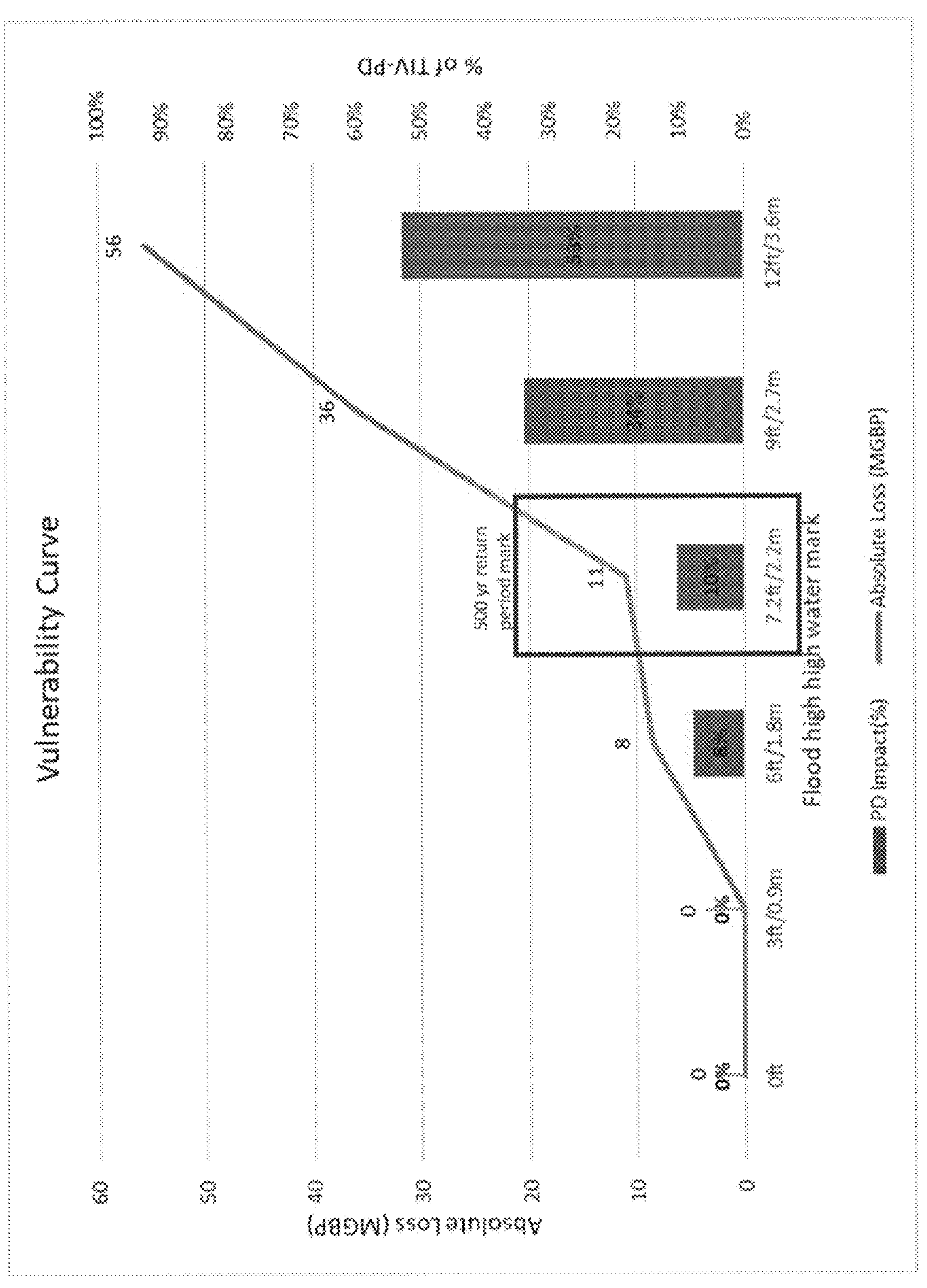

FIG. 12 shows a diagram, schematically illustrating an exemplary site specific vulnerability curve, provided by the measuring system 1. The system 1 has, thus, the further advantage that a user 4 can be provided with reliable, robust, absolute loss measures in dependence of the risk, the user 4 is willing to accept.

Figure 13:
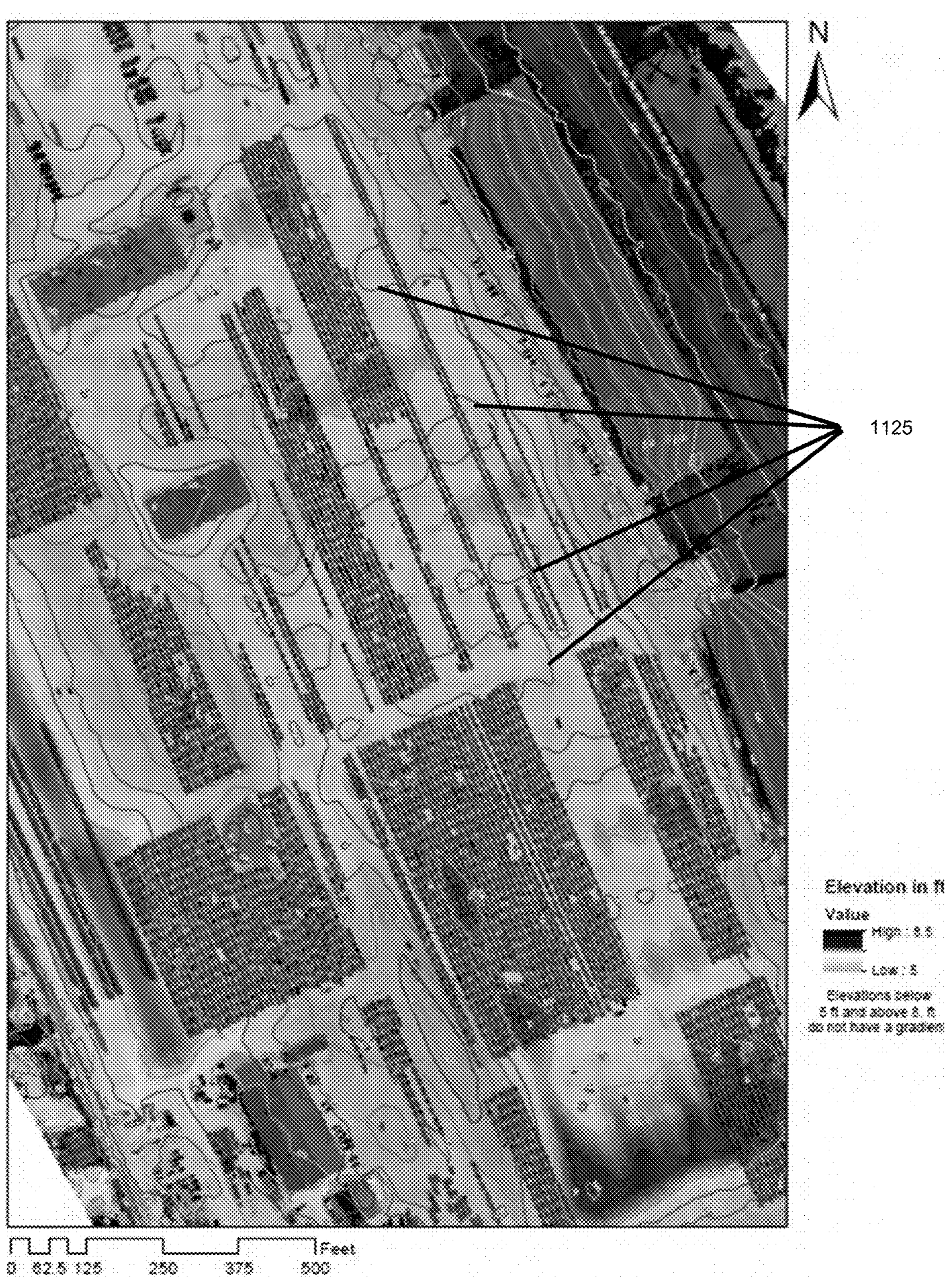
Figure 14:
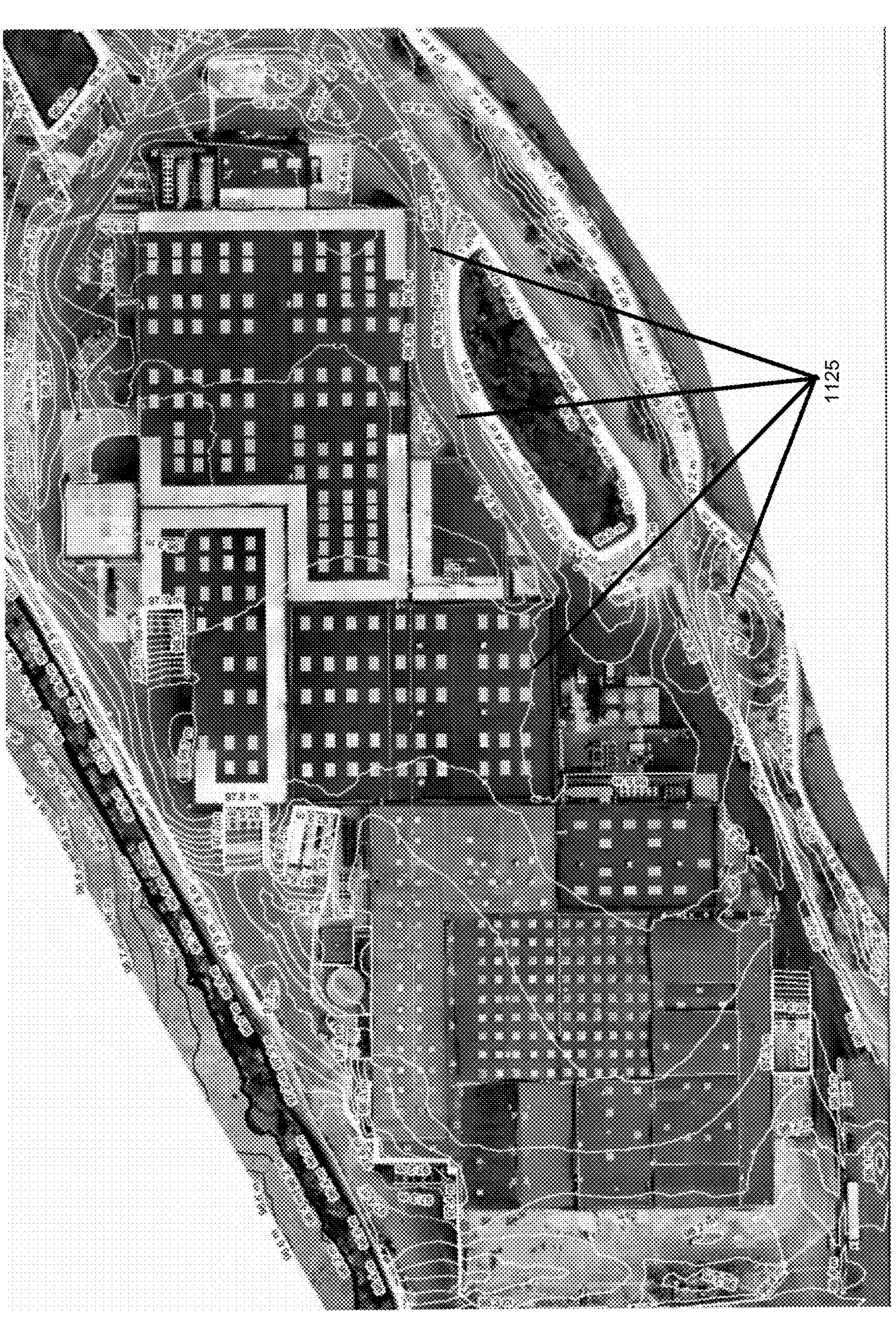

FIGS. 13 and 14 show a diagrams, schematically illustrating exemplary elevation/altitude contours/curves 1125 derived from the measured and geo-referenced 3D digital twin 1121.

Figure 15:
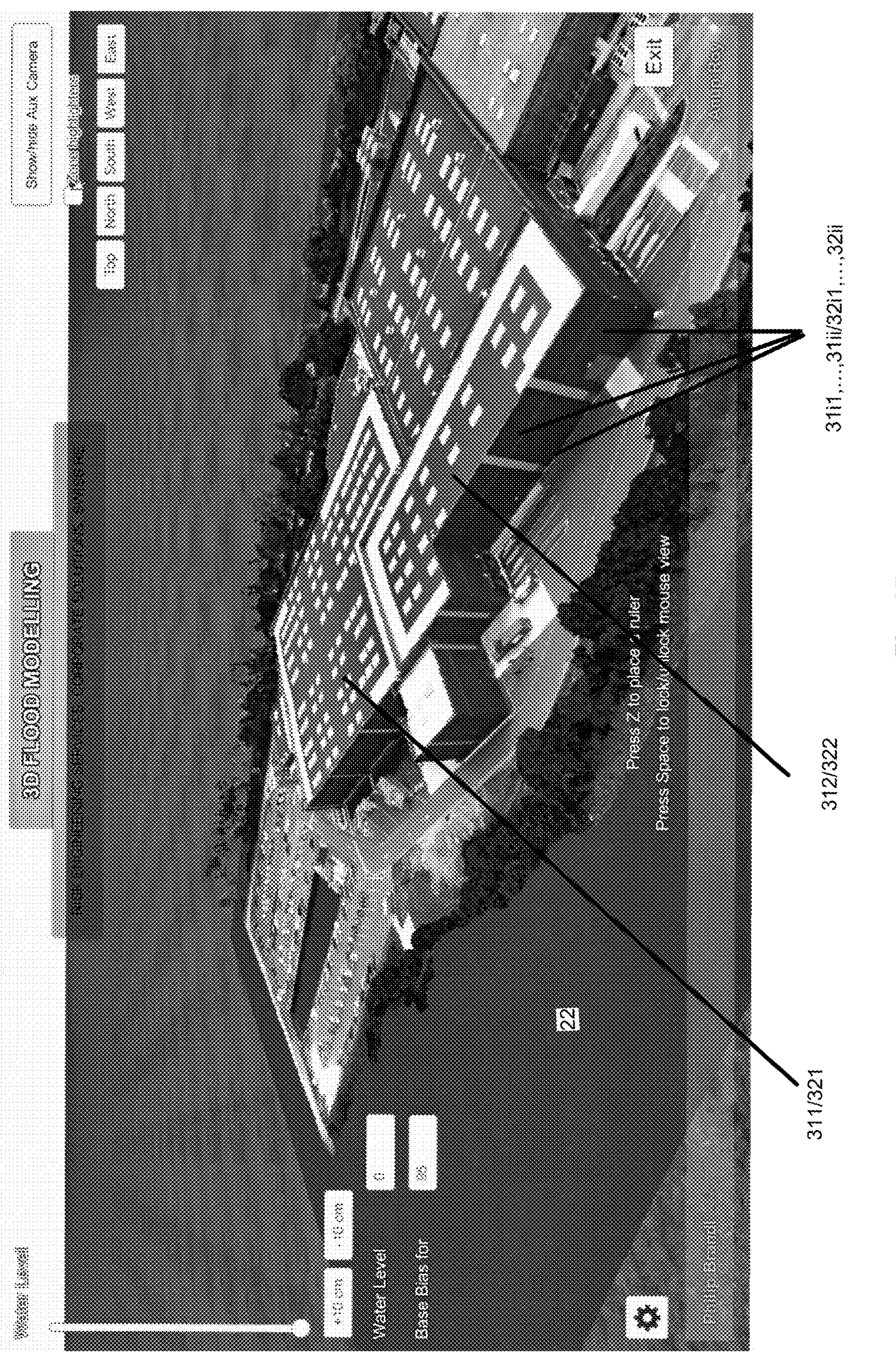

FIG. 15 shows a diagram, schematically illustrating an exemplary 3D simulation output by the inventive digital visual interface 115. The 3D digital twin 1121 allows to measure the impact not only in respect to different units 3/31, . . . , 33 and/or sub-units 311, . . . , 31*i*/321, . . . , 32*i*/331, . . . , 33*i*, and their mutual interrelations and importance in the overall operation (energy supply, storage etc.), but also their unit-specific structure, as e.g. different floor levels 31*i*1, . . . , 31*ii*/32*i*1, . . . , 32*ii* and/or unit-specific protection measures 34/341, . . . , 34*i*.

Figure 16:
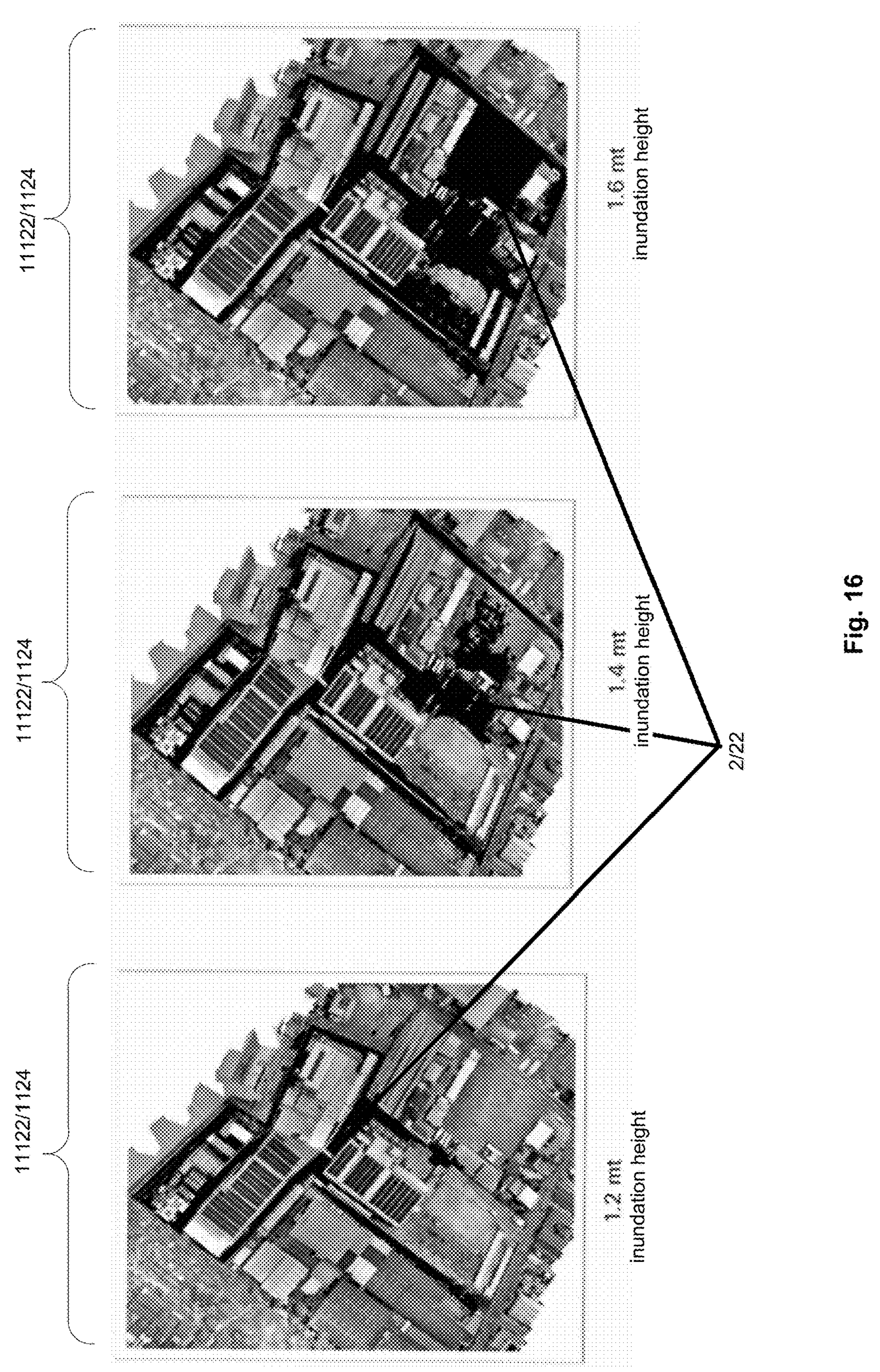

FIG. 16 shows a diagram, schematically illustrating exemplary flat water level rise maps extracted from the 3D digital twin 1121. The given elevation numbers (1.2 mt/1.4 mt/1.6 mt) of the inundation level are w.r.t. zero level datum WGS1984.

Figure 17:
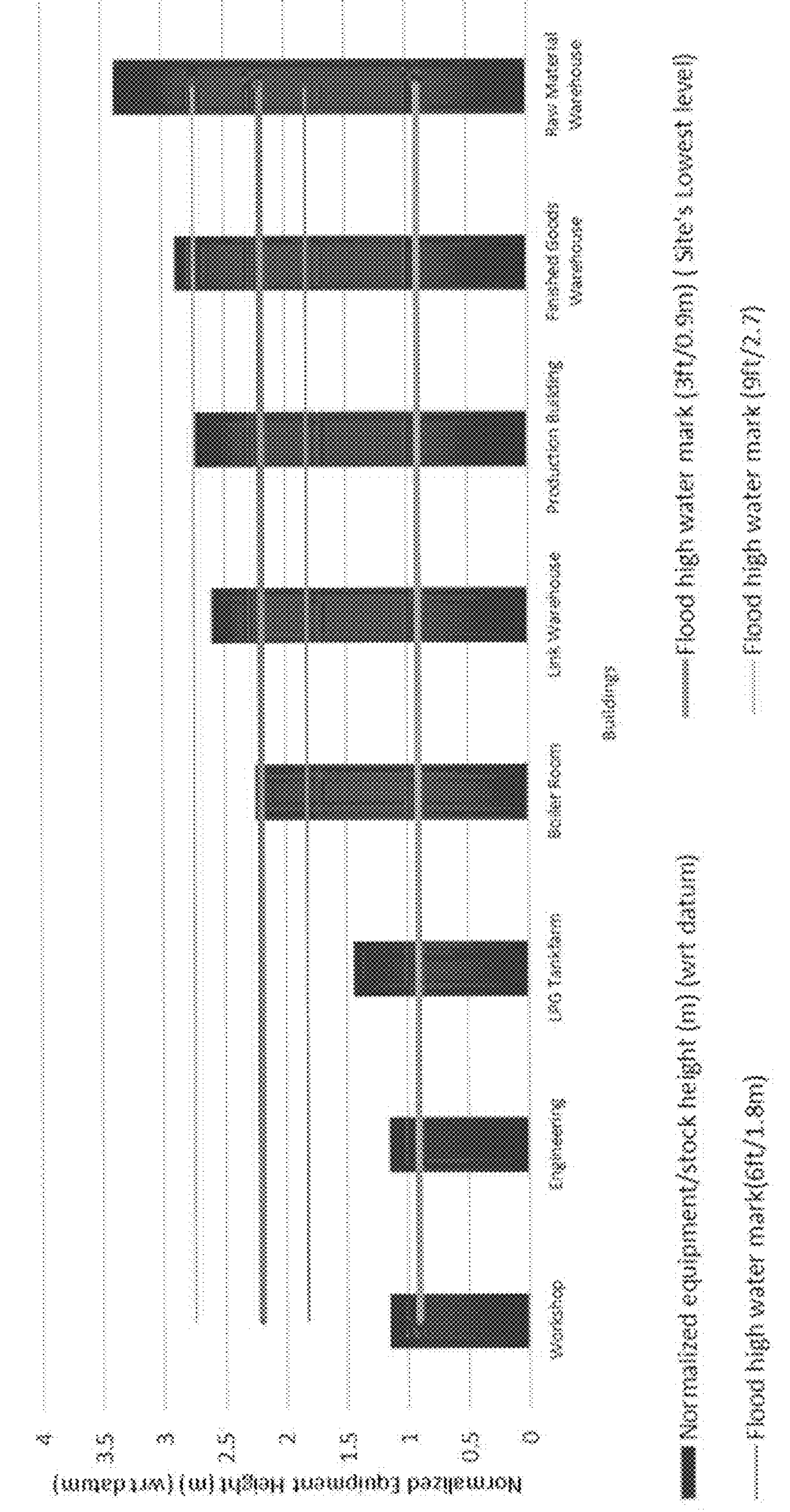

FIG. 17 shows a diagram, schematically illustrating an exemplary impact 23 with rise in flood water level w.r.t. WGS1984 datum. In this example, the measured impacts show that (i) no buildings are impacted with a flood high water mark of 1.1 m/3.6 ft, (ii) Boiler room without the protection was at 1.6 ft but with an effective protection measure its up at 2.25 mt, (iii) Boiler room, Liquefied petroleum gas (LPG) tank farm, engineering, workshop, link warehouse and production building are impacted with flood high water mark of 2.7 mt/~9 ft. Thus, the inventive system 1 allows to measure the impact 23 for each unit 3/31, . . . , 33 and/or sub-unit 311, . . . , 31*i*/321, . . . , 32*i*/331, . . . , 33*i*, separately, for different inundation heights 22 and/or return periods 21, which is each unit 3/31, . . . , 33 and sub-unit 311, . . . , 31*i*/321, . . . , 32*i*/331, . . . , 33*i* has its own vulnerability curve measured. In the digital 3D twin 1121, protection measures explicitly can be included resulting in a different vulnerability of the corresponding unit 3/31, . . . , 33 and sub-unit 311, . . . , 31*i*/321, . . . , 32*i*/331, . . . , 33*i*. For example, in a worst case flood scenario in case the water level breaches a finished floor elevation of the main production building of a site. The equipment below the finished floor elevation of main production building, for example a LPG tank farm, engineering etc. will sustain significant damage. In case, the water level breached the finished floor elevation of main production building, there would be some damage to the building and equipment on ground floor. Since the raw material/intermediate products/finished products are perishable and finished product is for human consumption, total loss of stock is considered. Further, estimation can be performed for a possible drain of the water of a flood 2. For example, it could be estimated that it would take nearly 2 weeks for the water to drain, and another 4 weeks for clean-up and loss assessment. Following this it would take nearly another 6 months to restore the damaged equipment and resume full operation. However, if for example a 500-year return period scenario is given, the site is expected to provide a defined property loss as per the generated vulnerability curve.

Figure 18:
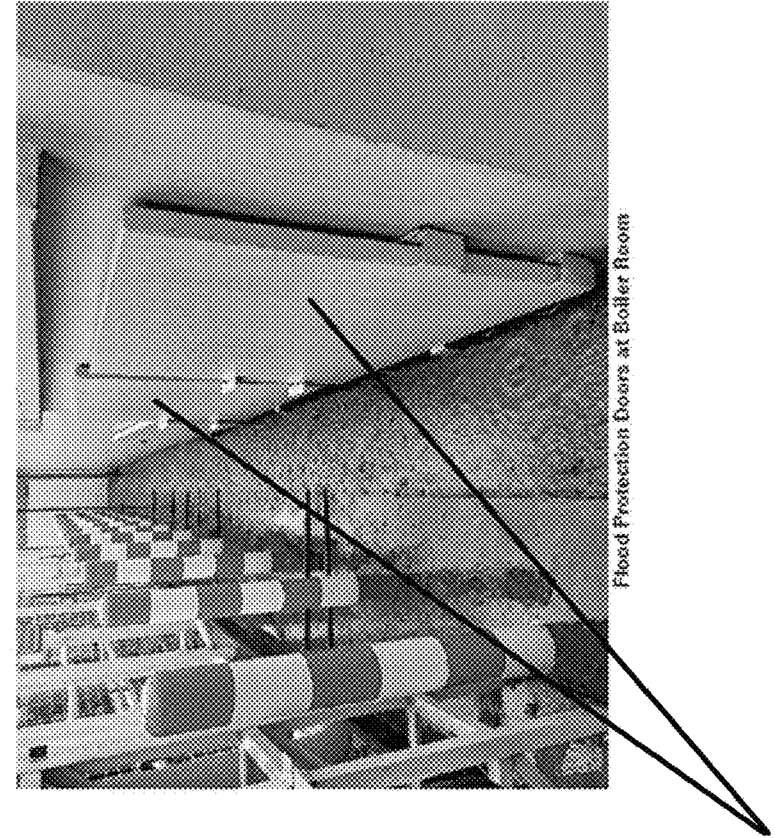
Figure 18:
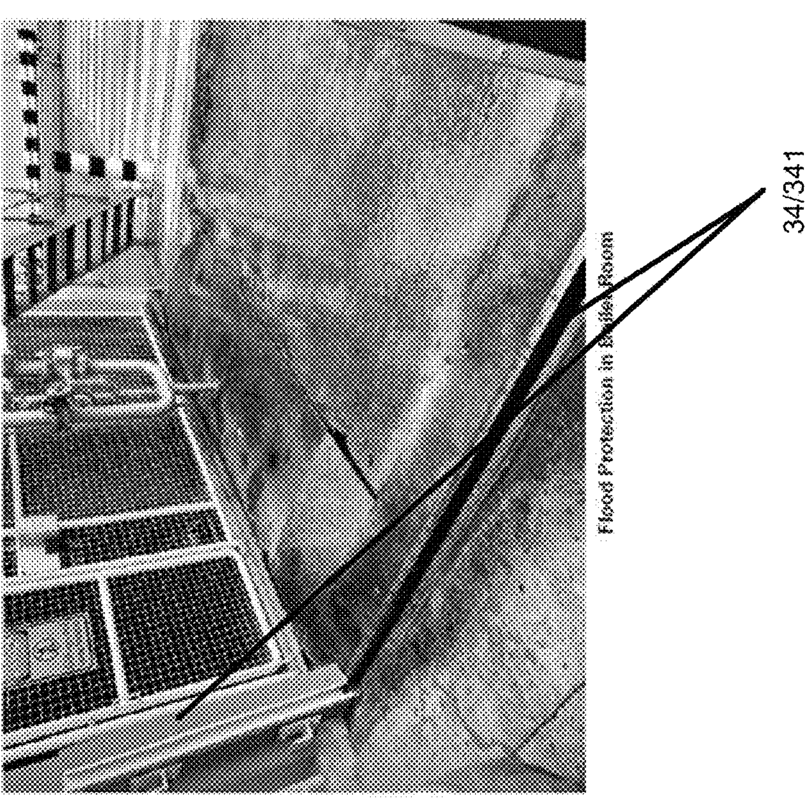

FIG. 18 shows a diagram, schematically illustrating exemplary flood protection measures 34/341/342 at an exemplary boiler room as sub-unit 311, . . . , 31*i*. The reference number 34/341 denotes exemplary flood protection/barriers in the exemplary boiler room, and the reference number 34/342 denotes flood protection doors at the exemplary boiler room. However, manual flood barriers typically highly dependent on an effective Flood Emergency Response Plan (FERP) which can e.g. be considered within the measurements by an appropriate weighting factor.

DETAILED DESCRIPTION

Figure 1:
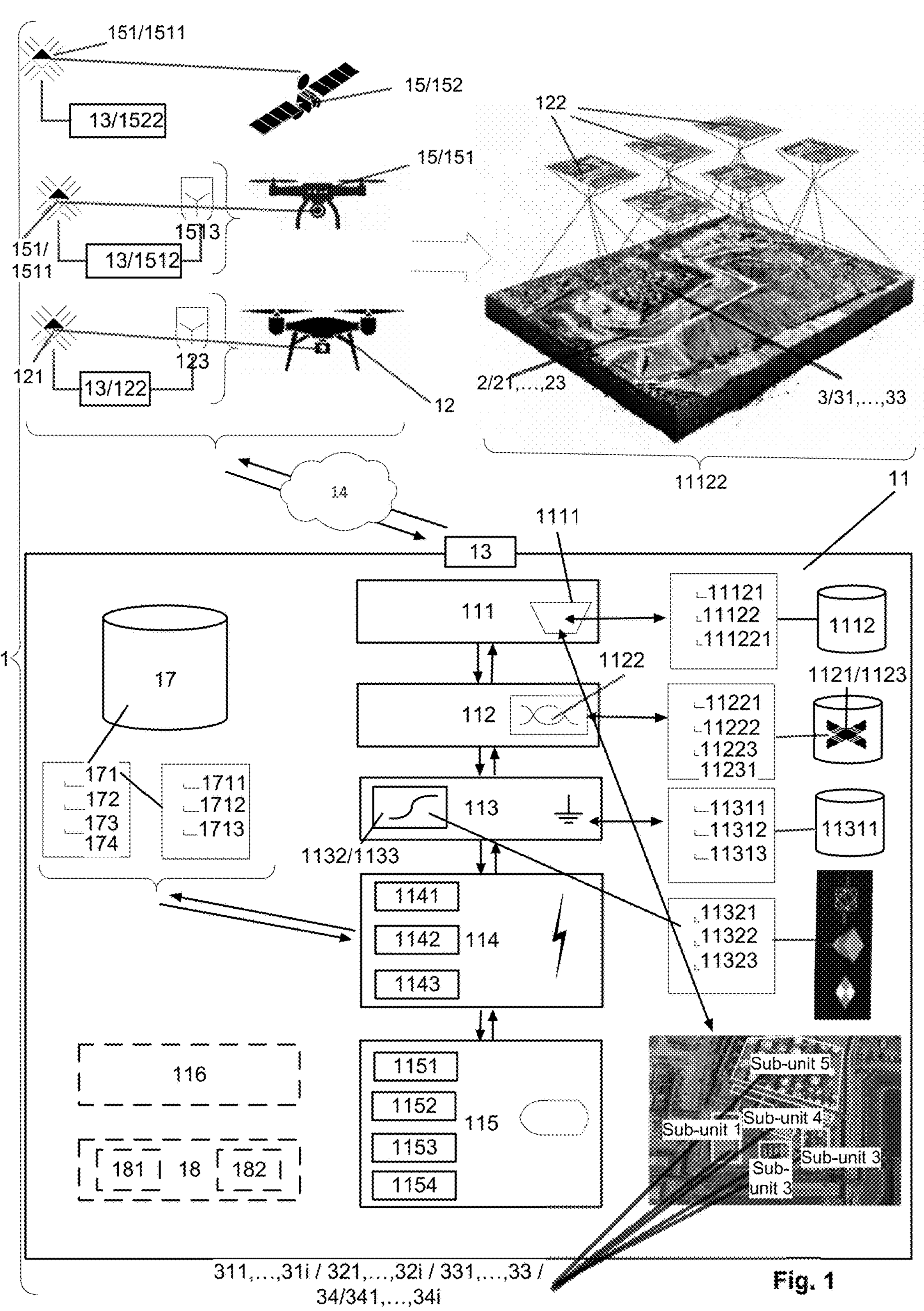
FIG. 1 shows a diagram, schematically illustrating an embodiment variant of the inventive drone-survey measurement based inundation probability forecast and flood hazard vulnerability measuring system 1 and method, wherein location-specific elevation data are measured by drones 12 of the measuring system 11, the measured location-specific elevation data being transmitted to an inundation engine 11 for forecasting flood hazard vulnerability zones and risk zones based on the said measured location-specific elevation data depending on return periods 21 or inundation heights 22 of flood hazards 2.

FIG. 1 shows a schematic overview of the present invention, which illustrates an overall operation of an embodiment of the drone-survey measurement based inundation probability forecast and flood hazard vulnerability measuring system 1. Location-specific elevation data are measured by drones 12 of the measuring system 11, the measured location-specific elevation data being transmitted to an inundation engine 11 for forecasting flood hazard vulnerability for different units 3/31, . . . , 33 and/or sub-units 311, . . . , 31*i*/321, . . . , 32*i*/331, . . . , 33*i* with a selected geographic area 1111 based on said measured location-specific elevation data depending on return periods 21 or inundation heights 22 of flood hazards 2 within the selected geographical area 1111, for example, defining a perimeter or contour in a geographical 2D ground view of an industrial site or plant or agriculture structure. In particular, the measuring system 1 measures location-specific parameter progression, e.g. as vulnerability curves, for the different units 3/31, . . . , 33 and/or sub-units 311, . . . , 31*i*/321, . . . , 32*i*/331, . . . , 33*i* within the selected geographic area 1111.

The measuring system 1 and/or the inundation engine 11 comprises a geo-tagging graphical user interface 111 for selecting perimeter points 11121 of a definable polygon 1112 on a geographical and/or topographical map 1111 provided by the geo-tagging graphical user interface 111, the polygon 1112 segregating a defined geographical area 11122 of the geographical and/or topographical map 1111 falling with said polygon 1112. To improve accuracy of the elevation and surface inclination measurements, the ground control points 1131 are placed both on the perimeter 11121 and scattered over the geographic target area 11122 defined by the polygon 1112. The geo-tagging graphical user interface 111 can e.g. comprise an interactive orthomap of orthophoto 1123 generated by the geo-tagging graphical user interface 111 for segregating different units 311, . . . , 31*i*/321, . . . , 32*i*/331, . . . , 33*i* of the objects/industrial assets 31 and/or building structures 32 and/or agriculture structures 33 as functional components within the geographical area 11122 of the polygon 1112, wherein, by the geo-tagging graphical user interface 111, one or more functions and/or interactions and/or dependencies is assignable to each of the functional components 31, . . . , 33 in regard to one or more of other segregated components 31, . . . , 33. FIG. 9 illustrates the geo-tagging graphical user interface 111 which can e.g. comprise an interactive orthomap 1123 or orthophoto 11231 or just an interactive photo generated by the geo-tagging graphical user interface 111 for segregating different sub-units 311, . . . , **31*i*/321, . . . , 32*i*/331, . . . , 33*i* of the objects/industrial assets 31 and/or building structures 32 and/or agriculture structures 33 as functional components within the geographical area 11122 of the polygon 1112, wherein, by the geo-tagging graphical user interface 111, one or more functions and/or interactions and/or dependencies is assignable to each of the functional components 31, . . . , 33 in regard to one or more of other segregated components 31, . . . , 33. Each sub-units 311, . . . , 31*i*/321, . . . , 32*i*/331, . . . , 33*i* has its own damage vulnerability curve assigned and measured by the measuring system 1. The system 1 has the advantage that just by changing the water level (e.g. by a user through a slider) the system 1 is able to provide in real time a physical damage measure (e.g. indicated by a monetary damage (loss measures for various return periods for both PD (property damage) and BI (business interruption losses). FIG. 10 shows a sub-units 311, . . . , 31*i*/321, . . . , 32*i*/331, . . . , 33*i* interaction scheme (which can also include parts of a business interruption model/scheme e.g. created through feedback with site personnel). The sub-units 311, . . . , 31*i*/321, . . . , 32*i*/331, . . . , 33*i* interaction scheme allows capturing dominos effect and redundancies between the units. For example, a break-down of a power supply unit or sub-unit, can induce the operational breakdown of a whole plant, while on the other side a damage of a storage unit may have only little immediate effect on the overall operation of an industrial plant. With the present invention, it is further e.g. possible to have one or more saved polygons 1112 on the geographical and/or topographical map 1111 so that a polygon 1112 can be selected and exported with only the points that fall into that polygon 1112**. For example, (i) A table visual with relevant information can be created, (ii) Then a table with different names (we used Area 1, Area 2 etc.) can e.g. be created, (iii) A measure is created to filter first from the naming list, (iv) A visual filter can be added to select the area, and the area is selected, (v) Naming column can be added to the visual table. The column can e.g. read Area 1, or what is selected, (vi) A PA Flow can be written to update the dataset with a "polygon" value, and finally (vii) the data can be refreshed, and the visual filter is populated with polygon options.

Figure 2:
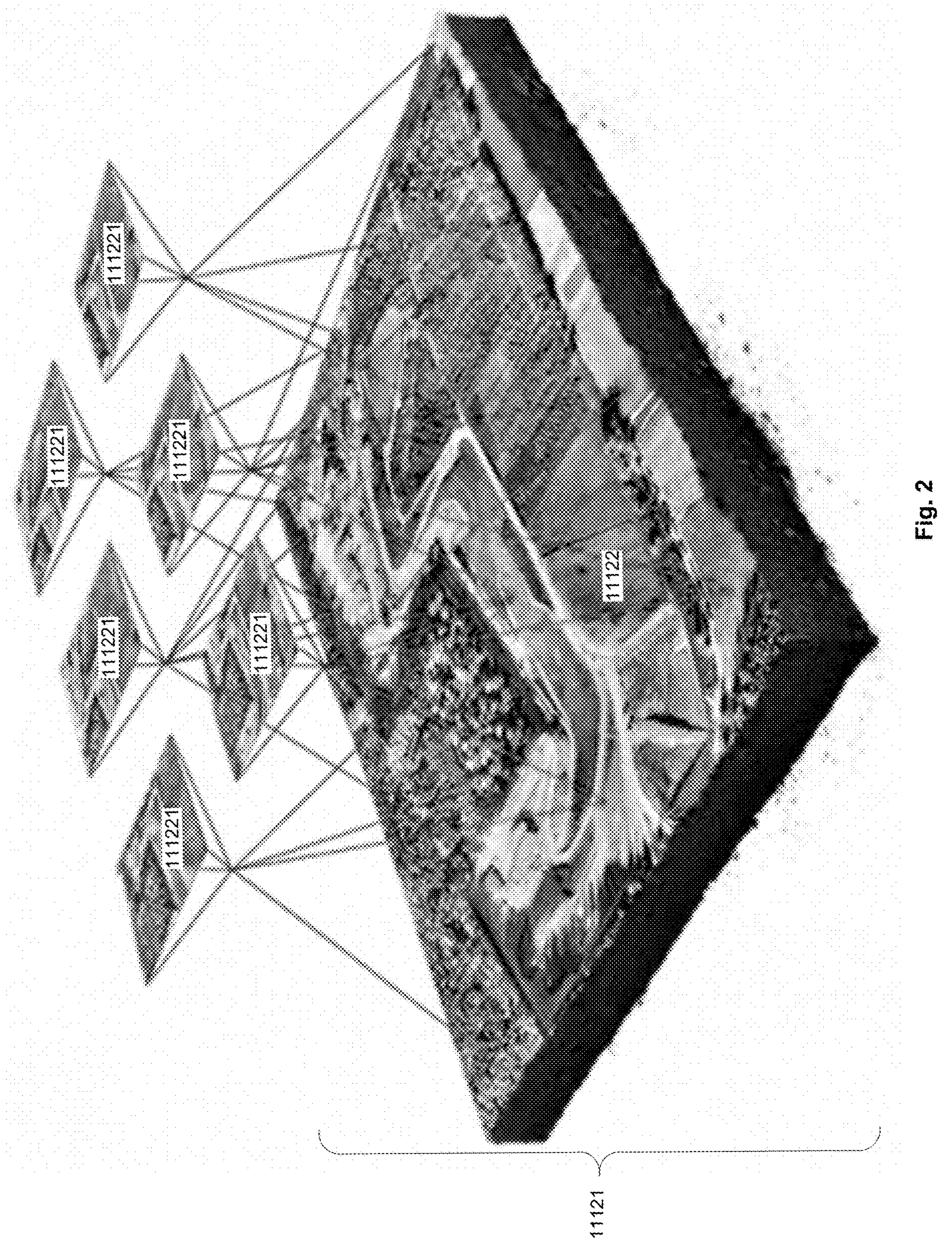
FIG. 2 shows a diagram, schematically illustrating the optical area sensing done by the one or more drones 12 of the measuring system 1 with the at least one optical sensor or camera 121, wherein different subareas 111221 of the geographical area 11122 within the polygon 1112 are captured by optical images 122, and wherein each possible location within the polygon is sensed at least by two of the optical images 122 measured by the optical sensor or camera 121 of the drone 12. The optical images 122 measured by the optical devices 121 of the drones 12 can e.g. be taken in respect to a specific coordinate system given by ground control points 1131 and/or simultaneously taken GPS-data by a GPS-module 123 of the drone 12.
Figure 3:
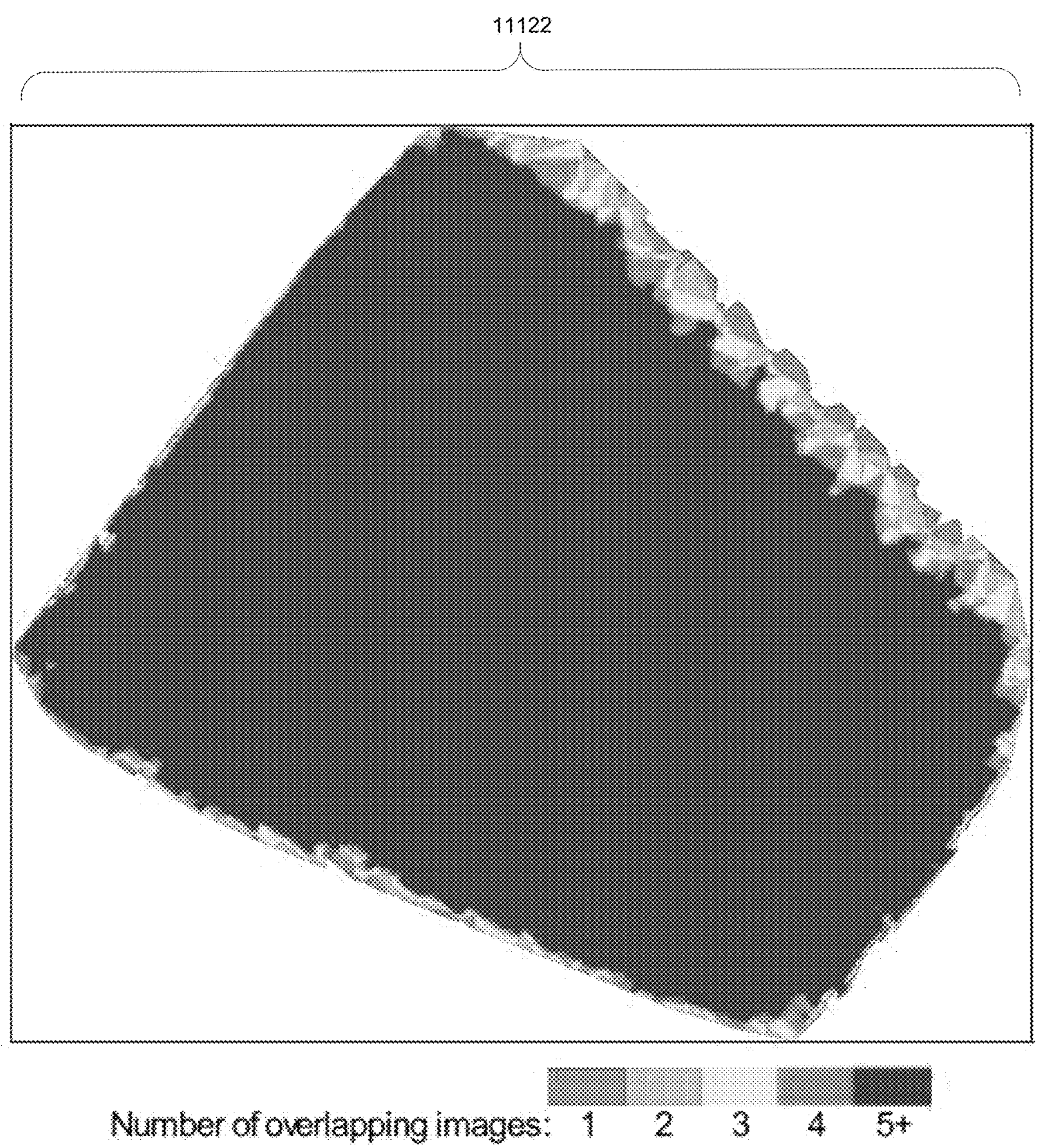
FIG. 3 shows a diagram, schematically illustrating a concrete example of a measurement, where (i) the optical image coordinate system is WGS 84 (EGM 96 Geoid), (ii) the ground control point 1131 (GCP) coordinate system: WGS 84/UTM zone 47N (2D), and (iii) the output coordinate system: WGS 84/UTM zone 47N (2D). The site's lowest point (i.e. the lowest point of the geographic target area 11122 defined by the polygon 1112) 0.9 m w.r.t. zero level of WSG1984 datum. To align and calibrate the data of the 3D digital twin 1121 extracted from the optical drone measurements 122, the described georeferencing is performed by the calibration module 113, scaling, aligning, and orienting the different coordinate systems, as described above. The different grey shades show the number of optical images 122 taken form the different subareas 111221 of the geographical area 11122.

The measuring system 1 comprises one or more drones 12 with at least one optical sensor or camera 121 for optical image sensing. Different subareas of the geographical area 11122 defined by the polygon 1112 are captured by optical images 122. Each possible location within the polygon is sensed at least by two of the optical images 122 measured by the optical sensor or camera 121 of the drone 12. FIG. 2 shows a diagram, schematically illustrating the optical area sensing done by the one or more drones 12 of the measuring system 1 with the at least one optical sensor or camera 121, wherein different subareas 111221 of the geographical area 11122 within the polygon 1112 are captured by optical images 122, and wherein each possible location within the polygon is sensed at least by two of the optical images 122 measured by the optical sensor or camera 121 of the drone 12. The optical images 122 measured by the optical devices 121 of the drones 12 can e.g. be taken in respect to a specific coordinate system given by ground control points 1131 and/or simultaneously taken GPS-data by a GPS-module 123 of the drone 12. FIG. 3 shows a concrete example of an inventive drone measurement, where (i) the optical image coordinate system is WGS 84 (EGM 96 Geoid), (ii) the ground control point 1131 (GCP) coordinate system: WGS 84/UTM zone 47N (2D), and (iii) the output coordinate system: WGS 84/UTM zone 47N (2D). The site's lowest point (i.e. the lowest point of the geographic target area 11122 defined by the polygon 1112) 0.9 m w.r.t. zero level of WSG1984 datum. To align and calibrate the data of the 3D digital twin 1121 extracted from the optical drone measurements 122, the below described georeferencing is performed by the calibration module 113, scaling, aligning, and orienting the different coordinate systems, as described above. The different grey shades show the number of optical images 122 taken form the different subareas 111221 of the geographical area 11122.

As discussed above, the three-dimensional coordinates of points on the geographic area 11122 can e.g. be measured based upon two or more optical images 122 taken from different positions by the drone 12, wherein common points are identified on each of the optical image 122 and a ray is generated from the optical sensor or camera 121 location to the measured point on the geographic area 11122, wherein an intersection of these rays triangulation determines the three-dimensional location of the point. A measuring accuracy for the drone-based measurements for elevation 11221 and surface inclination 11222 can e.g. be preferably at least equal to 5 cm or less. To achieve an accuracy of 5 cm or less for the elevation 11221 and surface inclination 11222 drone-based measurements, the root mean square error (RMSE) values at the ground control points 1131 can e.g. be preferably in a range of 15-25 mm or at least in a range of 35-40 mm. The measuring system 1 can e.g. further comprise a progressive morphological filter 16, wherein the root mean square error (RMSE) values of the 3D digital twin 1121 or the digital terrain model (DTM) are adjusted to be in the required range by the calibration of the parameters of the progressive morphological filter 16. The sensing of the optical images 122 by the at least one drone 12 can e.g. be timed with a definable overlap to provide capturing of each possible location within the polygon 1112 at least by two of the optical images 122 measured by the optical sensor or camera 121 of the drone 12. For the extraction of three-dimensional measurements from two-dimensional optical images providing the 3D map of the defined polygon 112, the distance between two points that lie on a plane parallel to the optical image 122 plane can e.g. be determined by measuring their distance on the image in respect to the scale of the optical image 122. Further, the 3D map of the polygon 1112 can e.g. be extracted from 3D coordinates giving the locations of object points in the 3D space of the 3D map of the polygon 1112, wherein image coordinates provide locations of object points' images on the optical sensor or camera 121 of the drone 12, wherein an exterior orientation of the optical sensor or camera 121 defines its location in space and its view direction, and the inner orientation defines the geometric parameters of the imaging process based at least on the focal length and/or lens distortions of the lens of the optical sensor or camera 121, and wherein by scale bar parameter values defining known a distance of two reference points in the polygon 1112, a calibration to the measuring optical sensor or camera 121 is provided. One of the technical advantage of the inventive drone-based measurements is that it is able to collect data for maps that will provide the technically required details on the site within the polygon 1112. The extracted 3D digital twin 1121 also provides location data down to centimeter-level accuracy, preferably ≤5 cm accuracy for the elevation measuring. Another advantage of the drone-based measurements providing orthomosaic/orthomaps 1123 orthophotos 11231 and 3D maps 1121 are the possibility to provide lifelike, intuitive views of industrial sites, construction sites, road projects and agriculture structures, to name just some of them.

The inventive drone-based measurements to extract the 3D digital twin of the site area have inter alia the advantage to be able to replace measurements based on satellite optical system and/or complex LIDAR systems (Light Detection And Ranging or Light Imaging, Detection And Ranging). Since drones 12 can fly closer to the ground, drones 12 have for the present application the technical advantage that they enable higher resolution and accuracy than manned aircraft. Drones 12 can cover great distances in a single flight to measure the optical data for the required extraction of the 3D digital twin. It is to be noted, that resolution, absolute data accuracy (reflecting real coordinates on the ground) and dependable results depend on the quality of the drone's camera as well as typically its onboard GNSS system. Further it has to be noted, as a specific embodiment variant for special application of the inventive system 1, the measurements based on the optical images 122 captured by the one or more drones 12 with the at least one optical sensor or camera 121 can e.g. be enhanced and/or completed by measurements of airborne laser scanning measurements comprising light detection and ranging systems by unmanned aerial vehicles 151 and/or remotely piloted aircraft systems 152 and/or optical image measurements by satellite-based optical sensors or cameras 153.

The inundation engine 11 comprises a 3D data extractor 112 linked via a data transmission interface 13 to the one or more drones 12. The captured optical images 122 are transmitted from the at least one drone 12 to the 3D data extractor 112. A drone measurement-based 3D digital twin 1121 of the geographical area 11122 defined by the polygon 1112 is extracted by three-dimensional measurements from the two-dimensional optical images 122. The three-dimensional measurements from the two-dimensional optical images for the extraction of the drone measurement-based 3D digital twin 1121 can e.g. at least comprise 3D textured mesh model measurements in a file size of full size with 100% highest quality and/or 50% size of an original measuring file size and/or 30% size of an original measuring file size and/or a digital surface model (DSM) of 5 cm ground sampling distance (GSD) or less, the ground sampling distance (GSD) being the distance between two consecutive pixel centers measured on the ground of the geographic target area given by the polygon 1112, and/or a digital terrain model (DTM) of 5 cm or less ground sampling distance (GSD) or less and/or an ortho-mosaic 5 cm or less resolution and/or an ortho-mosaic 1123 resolution of 50% of the original file and/or lat/long/height for two possible watercourses. For the present invention, the GSD measure can e.g. be measured based on (i) the flight height and/or the distance from the terrain or object of the measuring drone 12, (ii) the camera specifications comprising image width (ImW), sensor width (SW), and focal length (F). As FIG. 7 shows, the measuring of the Ground Sampling Distance (GSD) as the distance between two consecutive pixel centers measured on the ground. The bigger the value of the image GSD, the lower the spatial resolution of the image and the less optical details. As also illustrated by FIG. 7 the flight height (H) and camera specifications (ImW, SW, and F) influence the GSD measure value. Since the present inventive system is highly resolution sensitive, in particular sensitive to the elevation resolution and accuracy of the measured parameters of the 3D digital twin 1121, one of the advantages is that the required GSD value can be set before starting the image acquisition and optical sensing with the drones 12 in order to adjust the flight height and the camera specifications to the inventive system's 1 requirements. For example, the more detailed reconstruction of the area 11122 is needed, the drones are steered to fly closer (low GSD) to the target surface of the geographic area 11122 within the polygon 1112 and the different sub-units 311, . . . , 31*i*/321, . . . , 32*i*/331, . . . , 33*i* of the objects/industrial assets 31 and/or building structures 32 and/or agriculture structures 33 within the polygon 1112. On the other hand, when the technically needed resolution and accuracy (e.g. 5 cm elevation accuracy), flying not unnecessary deeper (i.e. having a higher GSD parameter value) can reduce and optimize the acquisition time and batteries needed as well as reduce the processing time. Thus, the inventive systems 1 also has the advantage that it can be technically optimized in that sense. It is to be noted, that even when flying at a constant height, the images of a target geographical area 11122 may not have the same GSD. This is due to terrain elevation differences and changes in the angle of the camera while shooting. Since the orthomosaic 1123 can e.g. be created using a 3D point cloud and the camera positions, an average GSD can be used. As an example, a GSD measure of 5 cm means that one pixel in the image represents linearly 5 cm on the ground (5*5=25 square centimeters), while a GSD of 30 cm means that one pixel in the image represents linearly 30 cm on the ground (30*30=900 square centimeters). Thus, to get, e.g. the preferred resolution of ≤5 cm, the GSD measure should be chosen accordingly. FIG. 8*a* shows a diagram, schematically illustrating an orthomosaic 1123 with a GSD of 5 cm, thus giving a more detailed resolution, while FIG. 8*b* shows a diagram, schematically illustrating an orthomosaic 1123 with a GSD of 30 cm resulting a less detailed resolution. The term orthomosaic 1123, as used herein, denotes a photogrammetrically orthorectified optical image assembly mosaicked from an image collection, where the geometric distortion has been corrected and the imagery has been color or grey-shade balanced to generate a seamless mosaic dataset. In general, an orthomosaic 1123 is a map that is made up of smaller orthophotos. Each aerial photo that a drone 12 captures is pinned to a geographic position. Optical images, i.e. photos, need to have an overlap of at least 70 percent to achieve an accuracy close to what is required for the present inventive system 1. Thus, an orthophoto 111231 is a single image with the distortions removed, while the orthomosaic or orthomap 1123 is the final optical map after stitching together all the individual orthophotos 11231. Thus, the inventive measuring system 1 can e.g. measure the three-dimensional coordinates of points on an object or structure 3 within the polygon 1112 employing measurements made in two or more photographic images taken from different positions. To achieve a preferred accuracy of ≤5 cm, up to 5 optical images can be required (see example surface in FIG. 3). Common points are identified on each optical image 111221. A ray is the generated from the optical sensor or camera 121 location of the drone 12 to the point on the object 3 or target surface 11122. Using the intersection of these rays (triangulation), the three-dimensional location of the point is determined by the measuring system 1. In an embodiment variant, the system 1 can also exploit other information about the area or industrial site within the polygon 1112 that is known, for example symmetries of building structures, in some cases allowing reconstructions of 3D coordinates from only one camera position. One of the advantages of the present inventive system 1 is that it provides a robust non-contacting measurement to determine dynamic characteristics and mode shapes of static, non-rotating or even rotating structures.

Figure 4:
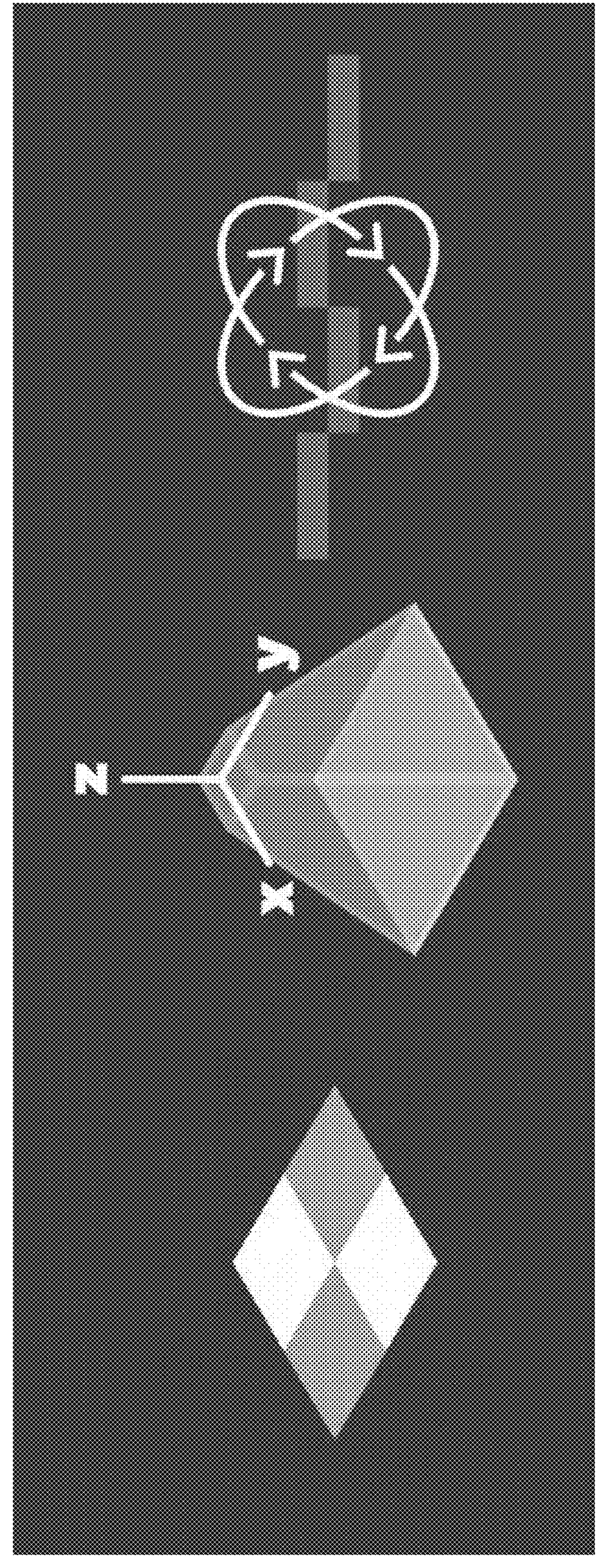
FIG. 4 shows a diagram, schematically illustrating the inventive georeferencing with a set of actions allowing to scale, orientate and place objects 3 correctly in the 3D digital twin 1122. A 3D digital twin 1122 with referencing is in the correct position in relation to the real world, has a scale, and can be measured. Referencing is essential in the present invention for surveying, inspection, and mapping and can impact the 3D reconstruction quality based on the 3D digital twin 1122 in a strong way. The georeferencing can e.g. be based on the ground control points and/or GPS data and displayed with GPS coordinates visible on the 3D reconstruction in a chosen coordinate system. As mentioned, the source of such referencing information can be preferable ground control points 1131, but also flight tracks (flight telemetry), and photo metadata. This way, the 3D digital twin 1122 will have all referencing attributes, as e.g. scale, orientation, and position. In particular, FIG. 3 also shows an embodiment variant of the herein used process of photogrammetry georeferencing wherein by a set of defined processing steps the geographic area 11122 within the polygon 1112 and the objects/building/agriculture structures 3 within the geographic area 11122 are scaled, orientated, and placed correctly for the 3D digital twin 1121. A photogrammetrical corrected 3D digital twin 1121 with referencing is in the correct position in relation to the real world, has a scale, and can be measured. The referencing 1132, as proposed herein, is essential for the inventive surveying, inspection, and mapping and can impact the 3D reconstruction quality of the generated 3D digital twin 1121. As an embodiment variant, the georeferencing is based on measured GPS data and can e.g. be displayed with GPS coordinates visible on the 3D digital twin's elements 3 and/or topographic layers, e.g. in a chosen coordinate system. The referencing information can be preferably ground control points 1131, but also flight tracks (flight telemetry), and/or photo metadata. Georeferencing can be at least partially processed drone-based if the drones are realized to store GPS location data in the photo file metadata. This way, a 3D digital twin 1121 will have referencing attributes present from the beginning-scale 11321, orientation 11322, and position 11323.

The measuring system 1 comprises a calibration module 113 to capture at least two ground control points 1131 within the geographic area 11122 defined by the polygon 1112. A ground control point 1131 is a defined mark on a target surface of the geographic area 11122 linked with geographical and/or topographical coordinates 11311/113111, . . . , 113113, wherein the ground control points 1131 provide georeferencing 1132 and geo-calibration 1133 for the drone-based image measurements 122 within the polygon 12 and the extracted 3D digital twin 1121 by assigning geographical coordinate data to the 3D digital twin 1121. FIG. 4 illustrates the inventive set of calibration and referencing 1132 steps allowing to scale, orientate and place objects 3 correctly in the 3D digital twin 1122. A 3D digital twin 1122 corrected by the inventive geo-referencing is in the correct position in relation to the real world, has a scale, and can be measured. Referencing is essential in the present invention for surveying, inspection, and mapping and can impact the 3D reconstruction quality based on the 3D digital twin 1122 in a strong way. The georeferencing can e.g. be based on the ground control points and/or GPS data and displayed with GPS coordinates visible on the 3D reconstruction in a chosen coordinate system. As mentioned, the source of such referencing information can be preferable ground control points 1131, but also flight tracks (flight telemetry), and photo metadata. This way, the 3D digital twin 1122 will have all referencing attributes, as e.g. scale, orientation, and position. In particular, FIG. 3 also shows an embodiment variant of the herein used process of photogrammetry georeferencing wherein by a set of defined processing steps the geographic area 11122 within the polygon 1112 and the objects/building/agriculture structures 3 within the geographic area 11122 are scaled, orientated, and placed correctly for the 3D digital twin 1121. A 3D digital twin 1121 corrected by the geo-referencing 1132 is in the correct position 11323 in relation to the real world, has the correct scale 11321, and is in the correct orientation 11322. The referencing 1132, as proposed herein, is essential for the inventive surveying, inspection, and mapping and can impact the 3D reconstruction quality of the generated 3D digital twin 1121. As an embodiment variant, the georeferencing 1132 is based on measured GPS data and can e.g. be displayed with GPS coordinates visible on the 3D digital twin's elements 3 and/or topographic layers, e.g. in a chosen coordinate system. The referencing information can be preferably ground control points 1131, but also flight tracks (flight telemetry), and/or photo metadata. Georeferencing 1132 can be at least partially processed drone-based if the drones are realized to store GPS location data in the photo file metadata. This way, a 3D digital twin 1121 will have referencing attributes present from the beginning-scale 11321, orientation 11322, and position 11323. For the inventive measuring system 1, since the simulated and/or forecasted inundation height 22 and return periods 21 of flood hazards 2 are strongly location and elevation dependent, one of the main technical issue when it comes to the realization of the georeferencing module 1132 can be the absolute location accuracy achieved. Simple GPS data can have strong variations in positioning, especially on Z-axis, which is of primary importance for the inventive measuring system 1. So this can result in objects or structures 3 within the polygon 1112 floating above ground or be slightly offset when viewing it on the 3D digital twin 1121 or orthomap 1123. For some applications, 3D reconstruction with adequate GPS data will still provide enough accuracy to get reliable measurements, where sometimes even +−2 centimeter relative accuracy can be obtained by GPS-measurement based georeferencing. However, to achieve reliable results, the herein proposed use of survey-grade ground control points, RTK modules, and/or PPK modules ensure to achieve the technically required or otherwise preferred absolute accuracy and positioning issues (e.g. ≤5 cm elevation and position accuracy). It is to be noted that the georeferenced 3D digital twin 1121 has, inter alia, the advantage, that it also be used to extract corrected Digital Elevation Model (DEM), Digital Surface Model (DSM) and Digital Terrain Model (DTM) visualizations.

The inundation engine 11 comprises a flood hazard aggregator 114 for generating a flood hazard vulnerability or risk 1141 for one or more objects/industrial assets 3/31 and/or building structures 3/32 and/or agriculture structures 3/33 situated within the polygon 1112 depending on return periods 21 and/or inundation heights 22 forecasted by the system 1 and/or user-specifically selected return periods 21 and/or inundation heights 22 based on flood hazard damage impacts 1142 to the one or more objects/industrial assets 3/31 and/or building structures 3/32 and/or agriculture structures 3/33 associated for different inundation heights 22 and/or return periods 21 depending on the measured 3D digital twin 1121. The flood hazard vulnerability measures 1141 can e.g. be separately measured as separate vulnerability curves 1144 measuring the vulnerability 1141 in respect to the inundation height 22 or return period 21 for each of the one or more units 3/31, . . . , 33 and/or sub-units 311, . . . , **31*i*/321, . . . , 32*i*/331, . . . , 33*i* situated within the polygon 1112. Thus, each sub-units 311, . . . , 31*i*/321, . . . , 32*i*/331, . . . , 33*i* has its own damage vulnerability curve 1144 and just by changing the water level (e.g. through a slider in the digital visual interface 115, the system 1 can e.g. provide in real-time a monetary damage equivalent to the actual physical damage as a measure (e.g. loss measures for various return periods 21** for both property damage and business interruption loss.

The specific flood impact 23 and/or vulnerability 1141 of a unit 3/31, . . . , 33 and/or sub-unit 311, . . . , **31*i*/321, . . . , 32*i*/331, . . . , 33*i* can e.g. be derived in two steps. First the return periods 21 and/or inundation heights 22, i.e. the flood risk is determined by simulation and/or flood forecasting using for example a physically based distributed hydrological modeling and/or forecasting module. In the second step, the flood hazard damage impact 23 for the one or more objects 31 and/or industrial assets 31 and/or building structures 32 and/or agriculture structures 33 situated within the polygon 1112 can e.g. be determined by the flood hazard aggregator 114 by matching the one or more objects/industrial assets 31 and/or building structures 32 and/or agriculture structures 33 to objects/industrial assets 1711 and/or building structures 1712 and/or agriculture structures 1713 of a digital data warehouse 17 of the measuring system 1 comprising historically measured flood hazard damage impacts 172 associated with corresponding or closely similar object structures and/or units 31, . . . , 33 and/or sub-units 311, . . . , 31*i*/321, . . . , 32*i*/331, . . . , 33*i* having corresponding inundation heights 173 and/or return periods 174**.

It is to be noted, that in the prior art, improving flood forecasting technology has long been the technical goal of the hydrological technology, and hydro-logical modelling have been the main tools for flood forecasting. Lumped conceptual modelling techniques are the predominant prior art forecasting systems usually aggregating the hydrological forcings, state variables and model parameters over the whole catchment, so they can not represent the spatial distribution of the terrain characteristics and hydrological forcings finely, thus reducing their technically achievable flood forecasting accuracy.

With the development of the present inventive 3D digital twin e.g. based on measurement resolution ≤5 cm, geo-referenced high-resolution terrain and site constructions measuring data can be applied to the forecasting. This has the technical advantage that it largely facilitated the use of physically based distributed hydrological modelling. As an embodiment variant, the present inventive system 1 can e.g. divide the geographic target area 11122 within the polygon 1112 into a number of grid cells at fine resolution and assimilate different surface/object structure data and precipitation to different cells, thus improving the catchment hydrological process simulation and prediction. The input modelling parameters are very important as they will determine the model performances in flood forecasting. It is to be noted, that some of the model parameters (of course except the measured parameters form the geo-referenced 3D digital twin 1121) cannot be measured directly; therefore, some of the physical parameters need to be estimated by model parameter estimation technique using related measurable parameter values. As the prior art lumped modelling used by the forecast systems has limited input model parameters, possible optimization technique has to be employed to calibrate the model parameters to improve the model's performance. However, also this is technically limited. As an embodiment variant, the forecasting can be based on the scalar concept, which also enables the parameter optimization of the physically based distributed hydrological modelling for the polygon 1112 flood forecasting. The optimization can be conducted due to the precise measurements using the digital 3D twin 1121. This embodiment variant can be realized using three steps: (i) parameter classification, (ii) parameter initialization and (iii) normalization, and automated parameter optimization. In herein used physically based distributed hydrological forecasting, the whole geographic area 11122 within the polygon 1112 can e.g. be divided into adaptable large numbers of grid cells (depending on the desired accuracy and resolution). The forecast and modelling parameters in each cell are different, so the total parameter number can be. However, the parameters can e.g. be classified into a few types, so as to reduce the parameter numbers needed to be optimized. It can e.g. be assumed that all modelling input parameters of the forecasting are related and only related to one physical property of the terrain of the geographic area 11122 including the topography, soil type and vegetation type. In this case, the input parameters of the forecasting can e.g. be classified as four types: the climate-related parameters, the topography-related parameters, the vegetation-related (land-use-related) parameters and soil-related parameters. With this classification, the parameters in different cells will have the same values if they have the same terrain properties. The independent parameters are defined based on this classification (i.e., the independent parameters are the parameters with the same terrain properties in each cell), and only the independent parameters need to be estimated and optimized. With this treatment, the number of model parameters with their values needed to be estimated will be largely reduced (i.e., from millions to tens), so the independent parameters can e.g. be optimized for the high-resolution requirements of the digital 3D twin 1121. After classifying the forecast input model parameters into independent parameters, the feasible values of the independent parameters can now be derived from the terrain physical properties directly. These values can be referred as the initial values of the forecast model input parameters. Next, the parameters can e.g. be normalized with the initial values. With this normalization, all parameters become no-unit variables. The normalized independent parameters can e.g. be automatically optimized. To choose the optimization criterion (objective function), it is to be noted that different objective functions result in different model parameters, thus different forecasting performances and accuracies. A single-objective function or multiple-objective functions can e.g. be chosen. Single-objective optimization uses one objective function in the parameter optimization. Multiple-objective optimization considers simultaneously two or more objective functions. The different objectives can have same measures quantitatively, such as to minimize the model efficiency and model efficiency for log-arithmetic transformed discharges simultaneously. So, the best choice can e.g. depend on the structure of the geographic area 11122 and/or the structure of the units 31, . . . , 33 and/or sub-units 311, . . . , 31*i*/321, . . . , 32*i*/331, . . . , 33*i*.

As an embodiment variant, the measuring system 1 can e.g. comprise a digital visual interface 115 for generating a user navigable interactive 3D map or 3D mesh 1151 and/or orthomosaic/orthophoto 1152 of at least parts of the geographic area 11122 defined by the polygon 1112. An orthomosaic/orthophoto 1152, as used herein, is a corrected, georeferenced, data-rich image of parts or the entire area within the polygon 1112 that can be zoomed in on to explore deeper levels of life-like detail, depending on the resolution. The digital visual interface 115 can e.g. comprise a flood level selector 1153 for selecting an inundation height 22 for the geographic area 11122 of the polygon 1112, wherein different inundation heights 22 are visualizable by the inundation engine 11 by generating a graphical representation of the 3D digital twin 1121 for each selected Inundation height 22. In an embodiment variant, the digital visual interface 115 can e.g. further comprise a reporting interface section 1154, wherein different earth warming scenarios 1143 are generated by the flood hazard aggregator 114 and wherein the flood hazard vulnerability 1141 for one or more objects/industrial assets 3/31 and/or building structures 3/32 and/or agriculture structures 3/33 situated within the polygon 1112 is generated depending on the forecasted return periods 21 and/or inundation heights 22 under at least one of the different earth warming scenarios 1143. For example, the digital visual interface 115 can comprise a 3D geo-visualization for flood hazard vulnerability zone and risk zone simulation and visualization. As embodiment variant, a web based application can e.g. enable flood risk visualization and related workflow for risk assessment and preventive strategies, in particular for initiating electronic signaling to steer associated automated systems by the inventive measuring system 1. In particular, the measuring system 1 can e.g. comprise a Web-GIS platform providing 3D visualization to visualize simulated inundation spread zones. The digital visual interface 115 can e.g. be realized having three sub-module to visualize (i) Bathtub filling and flat water height of flood simulation, (ii) Historical pre-run inundation visualization, and (iii) impact of inundation protection structure. In all the three sub-module, simulated scenarios of flood inundated area can e.g. be generated using high-resolution DTM (Digital Terrain Model) and DSM (Digital Surface Model) measured from the drone 12 survey and/or with additional other data source. The 3d ground reality can e.g. be created using a high resolution drone image portrayed on a 3D wireframe (e.g. provided by RES) or by overlaying extruded GIS shape (i.e., polygon or line) on the high resolution image. The bathtub filling and flat water filling for flood simulation module can e.g. facilitate the user to visualize the projected or simulated flood scenario and its extent of inundation. A modified bathtub filling technique can e.g. be used to delineate the inundation zone. The modified technique takes care for the direction of the filling and intelligently allow user to choose the source direction. The corresponding water level layer will be overlaid on the 3D surface to display the inundation coverage. The computation and displaying procedure shall happen 'on-the-fly' in order to reduce rendering time. A dashboard can e.g. comprise a required UI module to define the base elevation and dynamic water level value to generate corresponding water-level inundation layer 'on-the-fly'. Historical flood return period forecast can e.g. be important for sustainable construction planning and minimizing the asset damage and financial loss. This sub-module will have a pre-generated water-level or inundation extent layer using max water level during multiple historical return periods (e.g., 10-year, 20-year, 30-year, 40-year, 50-year, 75-year, 100-year etc.). The dashboard can e.g. have the option to select a predefined return period layer, along with custom return period and its inundation level entry option. The return period vs inundation height data can e.g. be provided by the described forecasting and modeling. In the absence of such data a basic water height increase can also be available. A UI can e.g. be given to provide the property damage and business interruption loss values associated with the area polygons 1112. Based on the vulnerability curves defined of the polygons, the system 1 measures loss estimates w.r.t. the water height at the location. This module can e.g. leverage RES algorithms for loss estimation forecast. The system 1 can e.g. comprise 3D contour visualization for float locations. It can e.g. comprise contour visualization from multiple data sources (remote sensing and drone data). The visualization can e.g. have color swatch options and contour range selector to run various analysis. The system 1 can also e.g. comprise distance measurement and elevation profile measurement. The system 1 can e.g. allow user to check the inundations for any given return period or on based on inundation height to check the protection structure requirement. The user 4 will be able to draw a structure with given height and can simulate the result to see how much inundation can be protected using such embankments heights. The system 1 can leverage rules for structures and AI models to simulation inundations in 3d. Further, the system 1 can e.g. comprise a climate change or risk module. This module can e.g. be built on top of previous functionalities. The purpose of this is to enable display of various return period vs inundation height flood scenarios (in 3D/2D) for various climate risk scenarios (SSPs). The data can e.g. be provided by appropriate simulation forecast. The system 1 can e.g. further comprise a geoportal which allows audit trail of all communications with respect to each geotagged asset or activity. Further it can allow users to annotate on map and communicate with other stakeholders as a part of workflow. Further this can e.g. enable engineers to share AOI with predefined list of drone providers for quotations, which can e.g. be replied via a private chat. Whenever a new data will be uploaded its will overwrite existing data, if any with a change log to keep track.

The flood hazard damage impact 23 for the one or more objects 31 and/or industrial assets 31 and/or building structures 32 and/or agriculture structures 33 situated within the polygon 1112 can e.g. be determined by the flood hazard aggregator 114 by matching the one or more objects/industrial assets 31 and/or building structures 32 and/or agriculture structures 33 to objects/industrial assets 1711 and/or building structures 1712 and/or agriculture structures 1713 of a digital data warehouse 17 of the measuring system 1 comprising historically measured flood hazard damage impacts 172 associated with corresponding inundation heights 173 and/or return periods 174. The inundation engine 11 can e.g. further comprise a flood forecast simulation module 111 forecasting location-specific and elevation-dependent forecasted inundation heights and/or return periods for the 3D digital twin 1121. Thus, based on the matching the one or more objects/industrial assets 31 and/or building structures 32 and/or agriculture structures 33 to objects/industrial assets 1711 and/or building structures 1712 and/or agriculture structures 1713 of the digital data warehouse 17, the flood hazard aggregator 114 can determine and/or generate the flood hazard damage impacts 172 for objects 3 within the polygon 1112 depending on the object characteristics and the flood hazard characteristics.

The inventive system 1 is one of the most precise measurement systems measuring loss driving perils and it is highly dependent and sensitive on elevation accuracy. The inventive system 1 allows to measure high fidelity elevation data through drones 12, which can be accomplished for specific embodiment variants with alternative data sources (as e.g. satellite optical systems or LIDAR measurement devices) and output it in a comprehensive format such as maps and visualizing 3D simulations. The inventive system 1 can technically support users 4 to identify the lowest lying areas at your site and showcase water incursion scenarios. Further, the system 1 hast the technical advantage to be able to provide distinct input signaling for further deeper risk engineering systems that measures risk factors and mitigation measures.

In an embodiment variant, the geographical coordinate data can e.g. be additionally measured by a GPS-module during capturing of the optical images 122 and associated with the ground control points 1131, wherein after capturing the optical images 122 by the at least one drone 12, the geographical coordinate data of the 3D digital twin 1121 are additionally corrected and enhanced by a post-processing kinematic module 18/181 (PPK) during based on the additional additionally measured geographical GPS coordinate data. For the PPK module 181, the drone 12 attaches geocoordinates to each optical image 122 based on an onboard GPS module 123 measurement. In addition during flight, a base unit (which could be a base station, an AeroPoint, or CORS network) also records positional information, however with more accurate triangulation. Post-flight, the two sets of GPS data are matched by the PPK module 181 using timestamps on the optical images 122. The more accurate positional data from the base is used to course-correct the data collected by the drone. The geographical coordinate data can e.g. also additionally be measured by a GPS-module 123 during capturing of the optical images 122 and associated with the ground control points 1131, wherein during capturing the optical images 122 by the at least one drone 12, the geographical coordinate data of the 3D digital twin 1121 are additionally corrected and enhanced by a real-time kinematic module 18/182 (RTK) during based on the additional additionally measured geographical GPS coordinate data. To achieve a required accuracy, the number of ground control points 1131 can e.g. be increased in the perimeter 11121 of the polygon 1112 and the geographic target area 11122 within the polygon 1112 until the required accuracy is achieved during scanning the geographic target area 11122 with the real-time kinematic module 182. It is to be noted, that both the GPS-based RTK module 18/182 and PPK module 18/181 correction are effective at capturing pinpoint location information in the framework of the present inventive system 1. They can e.g. be used in addition to the discussed geo-referencing using the ground control points 1131 as a further improvement in accuracy or they can e.g. be used in place of the geo-referencing using the ground control points 1131. It is to be noted that the RTK module 18/182, for the present measuring system 1, can be e.g. suitable for flat areas where obstructions are minimal. This is important, since trees, site units 3 or other structures can disrupt communications. Since the RTK module 18/182 relays information in real time, it requires reliable connectivity in order to send the information steadily. An interrupted connection can disrupt the data capture and transmission process and create gaps. For the inventive system 1, it is possible by using the RTK module 18/182 to obtain 2 cm level positioning in the target area 11122, and even better. Thus, the preferred accuracy of 5 cm can be achieved. Using the RTK module 18/182, the distance from the reference station can have an impact on the final positional accuracy that can be achieved.

The invention has the advantage that a drone-based measuring system for precise measuring of flood elevations and/or precise forecasting of quantitative flooding measure values and/or flood impact measures on objects within a selected topographic and/or geographic area impacted by an occurrence of a flood event is provided by (i) by capturing available location data comprising aerial and/or spaceborne optical measuring data and/or surveying measurement data for the selected area, (ii) measuring, by means of drone-based remote sensing devices, digital imagery sensory data and transmitting said imagery sensory data via a data transmission link to a central ground station, (iii) leveraging selectively and directedly the captured location data by the drone sensory measurements to leveraged measuring data and generate location-dependent elevation measurands based on the leveraged measuring data, and (iv) capturing, by a predefined data structure of a flood map generator, a geographic and/or topographic area to be covered, the data structure at least comprising definable area parameters capturing geographic location and/or geographic extent of said geographic and/or topographic area, and generating, by the flood map generator, a flood map with the measured elevation measurements based on the transmitted drone sensory data and the leveraged measuring data using the predefined data structure.

The present invention uses a different approach to existing prior art systems, starting from available location data, (i) it leverages the available location data (i.e. satellite data) by drone data to generate insights, (ii) it presents insights back to client in form of sophisticated web-based interface, (iii) provide inputs for parametric risk-transfer structures, and (iv) forecast/simulate future climate impact scenarios of flooding. This allows to provide the inventive drone-based measuring system to a more competitive price and lower operational costs. The present invention can be realized as a standalone solution or as part of larger flooding simulation systems and/or automated risk-transfer systems, and corresponding tailored risk-transfer structure set-ups. To present the results back to the client, the present invention can e.g. capture 3D files (from CAD files or .fbx files created by photogrammetry by drones) and uses video game engines like Unity, Unreal or WebGL (directly in the web browser) to simulate floods and give visual feel of the extent of damage for insurance risk mitigation purpose. This solution can also be used as a further input to other risk engineering services. Loss frequency is taken by available loss modelling structures (thus, getting return period vs inundation heights). The insights can be used to design appropriate risk-transfer products and risk covers or accomplish current risk mitigations. As further options, the present invention can e.g. be enhanced by site specific flood assessments, flash floods, tsunami simulation, drainage planning during fire-fighting. In addition to simulated sights of the exterior of a site, also interior can also be created in 3D by using technologies like RTAB Map. Further, also VR (Virtual Reality) integration can be provided. Therefore, inventive system can provide both interior and exterior from a flood perspective. In addition, VR can be applied to put the personnel in the virtual world with or without additional AR (Augmented Reality). The inventive measuring system can e.g. capture 3D files (e.g. from CAD files or .fbx files created by photogrammetry measuring by drones) and apply video game engines like Unity, Unreal or WebGL (directly in the web browser) to simulate flood and give visual feel of the extent of damage for insurance risk mitigation purpose. This modelling structure can e.g. be a further input to the risk engineering engine provided for the user. Loss frequency may be taken from known modelling structures (thus, getting return period vs inundation heights). The inventive measuring system can e.g. be enhanced by site specific flood assessments, flash floods, tsunami simulation, drainage planning during fire-fighting. Applying VR to put the personnel in the virtual world and later applying AR (augmented reality) C# scripts for customization. As an embodiment variant, only exterior on a site can e.g. be used for simulation but with a newer technology like RTAB Map interior can also be created in 3D and VR integration can be achieved. Therefore, the measuring system can e.g. comprise both interior and exterior from a flood perspective. The inventive measuring system can e.g. provide engines for crisis management, fire/explosion pre-plans, as well as real-time camera feed can be integrated. This may help top overcome blind spots or biased infield personnel experience. Emergency response planning and strategy planning in oil and gas or any other occupancy can also be provided. Explosion modelling for insurance MPL (maximum possible loss) generation can also be integrated. Congestion simulation may be possible for explosion. e.g. using a known tool called Extool that is a 2D system. Incident history reports—CSB (chemical safety board) can also be provided.

| List of references |
| --- |
| 1 Drone-survey measurement based inundation probability forecast and flood hazard vulnerability measuring system |
| 11 Inundation engine |
| 111 Geo-tagging graphical user interface |
| 1111 Interactive geographical or topographical map |
| 1112 Polygon |
| 11121 Perimeter points of the polygon |
| 11122 Geographic (target) area within the polygon |

-continued

| List of references |
|---|
| 111221 Geographic sub-areas captured by one optical image |
| 112 3D Data extractor |
| 1121 3D digital twin of the geographic area |
| 1122 Mesh point or area of the 3D digital twin |
| 11221 Elevation |
| 11222 Surface inclination |
| 11223 Latitude/Longitude/Altitude |
| 1123 Orthomap/orthomosaic |
| 11231 Orthophoto |
| 1124 Flat water level rise maps |
| 1125 Elevation/altitude curves |
| 113 Calibration module |
| 1131 Ground control points |
| 11311 Geographical and/or topographical coordinates |
| 113111 Latitude |
| 113112 Longitude |
| 113113 Altitude (mean sea level) |
| 1132 Georeferencing |
| 11321 Scale |
| 11322 Orientation |
| 11323 Position |
| 1133 Geo-calibration |
| 114 Flood hazard aggregator |
| 1141 Flood hazard vulnerability |
| 1142 Flood hazard damage impacts |
| 1143 Earth warming scenarios |
| 1144 Vulnerability curve of a unit and/or sub-unit |
| 115 Digital visual interface |
| 1151 User navigable interactive 3D map or 3D mesh |
| 1152 Orthophoto/orthomosaic |
| 1153 Flood level selector |
| 1154 Reporting interface section |
| 12 Drone |
| 121 Optical sensor or camera |
| 122 Measured optical images |
| 123 GPS module |
| 13 Data transmission interface |
| 14 Data transmission network |
| 15 Additional optical sensing systems |
| 151 Unmanned aerial vehicle (UAV)/Remotely piloted aircraft system (RPAS) |
| 1511 LIDAR measuring device |
| 1512 LIDAR measurements |
| 1513 GPS module |
| 152 Satellite |
| 1521 Satellite-based optical sensors or cameras |
| 1522 Satellite-based optical measurements |
| 16 Progressive morphological filter (PMF) |
| 17 Digital data warehouse |
| 171 Objects/building/agriculture structures |
| 1711 Object/industrial asset/industrial plant |
| 1712 Building structure |
| 1713 Agriculture structure |
| 172 Historical measured flood hazard impacts/damages/losses |
| 173 Historical flood height associated with a flood hazard impact |
| 174 Historical return period associated with a flood hazard impact |
| 18 Enhancement modules |
| 181 Post-processing kinematic module (PPK) |
| 182 Real-time kinematic module (RTK) |
| 2 Flood hazard |
| 21 Return period |
| 22 Inundation height/level |
| 23 Flood hazard impact/loss/damage |
| 3 Objects/building/agriculture structures |
| 31 Object/industrial asset/industrial plant |
| 311,...,31i Sub-Units |
| 31i1,....,31ii Floor levels of a sub-Unit |
| 32 Building structure |
| 321,...,32i Sub-Units |
| 32i1,....,32ii Floor levels of a sub-Unit |
| 33 Agriculture structures |
| 331,...,33i Sub-Units |
| 34 Protection measure |
| 341,...,34i Different protection measures of units or sub-units |
| 4 User |

The invention claimed is:

1. A drone-survey measurement based inundation probability forecast and flood hazard vulnerability measuring system, wherein location-specific elevation data are measured by drones of the measuring system, the measured location-specific elevation data being transmitted to an inundation engine for measuring and/or measurement-based forecasting of flood hazard vulnerabilities for different units and/or sub-units based on said measured location-specific elevation data, the system comprising:

a geo-tagging graphical user interface for selecting perimeter points of a definable polygon on a geographical and/or topographical map provided by the geo-tagging graphical user interface, the polygon segregating a defined geographical area of the geographical and/or topographical map falling with said polygon, one or more of the drones having at least one optical sensor or camera for optical image sensing, different subareas of the geographical area defined by the polygon being captured by optical images and each possible location within the polygon being sensed by at least two of the optical images measured by the optical sensor or camera of the one or more of the drones, a 3D data extractor linked via a data transmission interface to the one or more of the drones, the captured optical images being transmitted from the one or more of the drones to the 3D data extractor, a drone measurement-based 3D digital twin of the geographical area defined by the polygon being extracted by three-dimensional measurements from the captured optical images, three-dimensional coordinates of points on the geographic area being measured based upon the at least two of the optical images of a location taken from different positions of one or more of the drones, common points being identified on each of the at least two of the optical images, a ray being generated from a location of the at least one optical sensor or camera to a measured point on the geographic area, and an intersection of these rays triangulation determining a three-dimensional location of a point, a calibration module to capture at least two ground control points within the geographic area defined by the polygon, a ground control point being a defined mark on a target surface of the geographic area linked with geographical and/or topographical coordinates, and the at least two ground control points providing georeferencing and geo-calibration for the at least two of the optical images within the polygon and the 3D digital twin by assigning geographical coordinate data to the 3D digital twin, and to achieve an accuracy of 5 cm or less for elevation and surface inclination drone-based measurements, root mean square error values at the at least two ground control points is in a range of 15-40 mm, a progressive morphological filter, root mean square error values of the 3D digital twin or a digital terrain model being adjusted to be in a required range by calibration of parameters of the progressive morphological filter, and a flood hazard aggregator for generating flood hazard vulnerability measures for one or more of the units and/or sub-units situated within the polygon depending on forecasted or user-specifically selected return periods and/or inundation heights based on flood hazard damage impacts to the one or more of the units and/or sub-units associated for different of the inundation heights and/or the return periods depending on the 3D digital twin.

2. The system according to claim 1, further comprising a digital visual interface for generating a user navigable interactive 3D map or 3D mesh and/or orthomosaic/orthophoto of at least parts of the geographic area defined by the polygon.

3. The system according to claim 2, wherein the digital visual interface includes a flood level selector for selecting an inundation height for the geographic area of the polygon, and different of the inundation heights are visualizable by generating a graphical representation of the 3D digital twin for each selected Inundation height.

4. The system according to claim 2, wherein the digital visual interface includes a reporting interface section, different earth warming scenarios are generated by the flood hazard aggregator and a flood hazard vulnerability for one or more objects/industrial assets and/or building structures and/or agriculture structures situated within the polygon is generated depending on the forecasted return periods and/or inundation heights under at least one of the different earth warming scenarios.

5. The system according to claim 1, wherein a measuring accuracy for the elevation and surface inclination drone-based measurements is at least equal to 5 cm or less.

6. The system according to claim 1, wherein the three-dimensional measurements include 3D textured mesh model measurements in a file size of full size with 100% highest quality and/or 50% size of an original measuring file size and/or 30% size of an original measuring file size and/or a digital surface model of 5 cm ground sampling distance or less, the ground sampling distance being a distance between two consecutive pixel centers measured on the ground of the geographic area given by the polygon, and/or the digital terrain model of 5 cm or less ground sampling distance or less and/or an ortho-mosaic 5 cm or less resolution and/or an ortho-mosaic resolution of 50% of the original file and/or lat/long/height for two possible watercourses.

7. The system according to claim 4, wherein a flood hazard damage impact for the one or more objects and/or industrial assets and/or building structures and/or agriculture structures situated within the polygon is determined by the flood hazard aggregator by matching the one or more objects/industrial assets and/or building structures and/or agriculture structures to objects/industrial assets and/or building structures and/or agriculture structures of a digital data warehouse including historically measured flood hazard damage impacts associated with corresponding inundation heights and/or return periods.

8. The system according to claim 1, further comprising a flood forecast simulation module forecasting location-specific and elevation-dependent forecasted inundation heights and/or return periods for the 3D digital twin.

9. The system according to claim 1, wherein the sensing of the one or more of the drones is timed with a definable overlap to provide capturing of each possible location within the polygon by the at least two of the optical images measured by the optical sensor or camera of the one or more of the drones.

10. The system according to claim 1, wherein for extraction of three-dimensional measurements from two-dimensional optical images providing a 3D map of the defined polygon, a distance between two points that lie on a plane parallel to an optical image plane is determined by measuring their distance on a respective image in respect to a scale of the respective image, the 3D map of the polygon is extracted from 3D coordinates giving locations of object points in a 3D space of the 3D map of the polygon, image coordinates provide locations of images of the object points on the at least one optical sensor or camera of the one or more of the drones, an exterior orientation of the at least one optical sensor or camera defines its location in space and its view direction, and an inner orientation defines geometric parameters of an imaging process based at least on a focal length and/or lens distortions of a lens of the at least one optical sensor or camera, and by scale bar parameter values defining a distance of two reference points in the polygon, a calibration to the at least one optical sensor or camera is provided.

11. The system according to claim 1, wherein geographical coordinate data are measured by a GPS-module during capturing of the optical images and associated with the ground control points, and after capturing the optical images by the one or more of the drones, the geographical coordinate data of the 3D digital twin is corrected and enhanced by a post-processing kinematic module based on the measured geographical GPS coordinate data.

12. The system according to claim 1, wherein geographical coordinate data are measured by a GPS-module during capturing of the optical images and associated with the ground control points, and during capturing the optical images by the one or more of the drones, the geographical coordinate data of the 3D digital twin is corrected and enhanced by a real-time kinematic module based on the measured geographical GPS coordinate data.

13. The system according to claim 12, wherein, to improve accuracy of the elevation and surface inclination measurements, the ground control points are placed both on a perimeter and scattered over the geographic area defined by the polygon.

14. The system according to claim 13, wherein, to achieve a required accuracy, a number of the ground control points is increased in the perimeter of the polygon and the geographic area within the polygon until the required accuracy is achieved during scanning the geographic area with the real-time kinematic module.

15. The system according to claim 1, wherein the geo-tagging graphical user interface includes an interactive orthomap or orthophoto generated by the geo-tagging graphical user interface for segregating the different units and/or sub-units as functional components within the geographical area of the polygon, and by the geo-tagging graphical user interface, one or more functions and/or interactions and/or dependencies is assignable to each of the functional components in regard to one or more of other functional components.

16. The system according to claim 1, wherein measurements based on the optical images captured by the one or more of the drones with the at least one optical sensor or camera are enhanced and/or completed by measurements of airborne laser scanning measurements including light detection and ranging systems by unmanned aerial vehicles and/or remotely piloted aircraft systems and/or optical image measurements by satellite-based optical sensors or cameras.

17. The system according to claim 1, wherein the units include objects/industrial assets and/or building structures and/or agriculture structures.

18. The system according to claim 1, wherein the flood hazard vulnerability measures are measured as separate vulnerability curves measuring vulnerability in respect to the inundation height or return period for each of the one or more of the units and/or sub-units situated within the polygon.

* * * * *